United States Patent
Freeman et al.

(10) Patent No.: US 9,684,928 B2
(45) Date of Patent: Jun. 20, 2017

(54) FOOT TRACKING

(71) Applicant: Holition Limited, London (GB)

(72) Inventors: Russell Freeman, London (GB);
Benjamin Thomas Martin, London (GB)

(73) Assignee: HOLITION LIMITED, London (GB)

(*) Notice: Subject to any disclaimer, the term of this patent is extended or adjusted under 35 U.S.C. 154(b) by 227 days.

(21) Appl. No.: 14/155,539

(22) Filed: Jan. 15, 2014

(65) Prior Publication Data

US 2015/0199816 A1    Jul. 16, 2015

(51) Int. Cl.
| | |
|---|---|
| G06Q 30/06 | (2012.01) |
| G06T 19/00 | (2011.01) |
| G06K 9/00 | (2006.01) |
| G06T 7/73 | (2017.01) |

(52) U.S. Cl.
CPC ..... *G06Q 30/0643* (2013.01); *G06K 9/00362* (2013.01); *G06T 7/74* (2017.01); *G06T 19/006* (2013.01); *G06T 2207/10028* (2013.01)

(58) Field of Classification Search
CPC ....... G06T 19/006; G06T 7/0044; G06T 7/74; G06Q 30/0643; G06K 9/00362
See application file for complete search history.

(56) References Cited

U.S. PATENT DOCUMENTS

| | | | | |
|---|---|---|---|---|
| 2009/0122058 A1* | 5/2009 | Tschesnok | ............ | G06T 7/0067 345/420 |
| 2009/0175540 A1* | 7/2009 | Dariush | ............ | G06K 9/00362 382/195 |
| 2011/0080336 A1* | 4/2011 | Leyvand | ................ | A63F 13/06 345/156 |
| 2014/0045593 A1* | 2/2014 | Giusti | .................... | A63F 13/06 463/32 |

FOREIGN PATENT DOCUMENTS

| | | | |
|---|---|---|---|
| GB | 2509783 A | * | 7/2014 |
| KR | 20110019948 | | 3/2011 |
| TW | M441358 | | 11/2012 |
| WO | WO-2014/111708 A1 | * | 7/2014 |

OTHER PUBLICATIONS

GB Search Report for GB1300726.5 of Aug. 29, 2013.
(Continued)

*Primary Examiner* — Jeffery A Brier
(74) *Attorney, Agent, or Firm* — Morris & Kamlay LLP

(57) ABSTRACT

A system and method are described for tracking the location and orientation of a user's feet for an augmented reality display. A depth sensor generates a depth map of a scene within the field of view of the depth sensor, the field of view containing at least a portion of the user. A processor is configured to identify a portion of the depth map as a candidate object for foot tracking, determine a central skeleton representation of the identified portion, determine a location of a toe of the user's foot and a location of an ankle of the user's foot, based on the central skeleton representation, and calculate an orientation of the user's foot based on the determine locations of the toe and the ankle.

14 Claims, 17 Drawing Sheets

(56) References Cited

OTHER PUBLICATIONS

Goertz, ""Goertz: The Augmented Reality Shoe Store"", Digital Buzz Blog, "Goertz: The Augmented Reality Shoe Store" [online] published Jun. 21, 2012.
Point Cloud Library, "PCL API Documentation", originally published at http://docs.pointclouds.org/trunk/index.html, available at https://web.archive.org/web/20130914041503/http://docs.pointclouds.org/trunk/index.html (Sep. 14, 2013).
Point Cloud Library, "Correspondence Estimation", originally published at http://docs.pointclouds.org/trunk/classpcl11registration_1_1_correspondence_estimation.html, available at https://web.archive.org/web/20141013121854/http://docs.pointclouds.org/1.7.0/classpcl_1_1registration_1_1_correspondence_estimation.html (Oct. 13, 2014).
Point Cloud Library, "CorrespondenceRejectorOneToOne", originally published at http://docs.pointclouds.org/1.7.0/classpcl_1_1registration_1_1_correspondence_rejector_one_to_one.html, available at https://web.archive.org/web/20141013183826/http://docs.pointclouds.org/1.7.0/classpcl_1_1registration_1_1_correspondence_rejector_one_to_one.html (Oct. 13, 2014).
Point Cloud Library, "Transformation Estimation", originally published at http://docs.pointclouds.org/1.0.0/classpcl_1_1registration_1_1_transformation_estimation.html, available at https://web.archive.org/web/20150425205754/http://docs.pointclouds.org/1.7.0/classpcl_1_1registration_1_1_transformation_estimation.html (Apr. 25, 2015).
Point Cloud Library, "FPFHEstimationOMP Member List", available at http://doc.pointclouds.org/trunk/classpcl_1_1_f_p_f_h_estimation_o_m_p-members.html (last visited Sep. 19, 2016).

\* cited by examiner

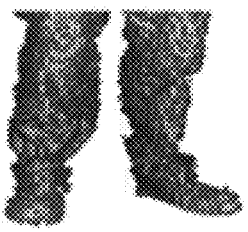
FIG. 15A
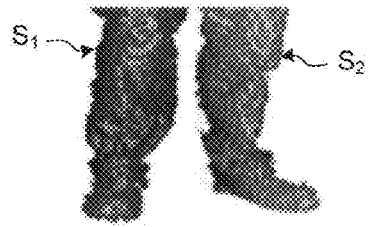
FIG. 15B
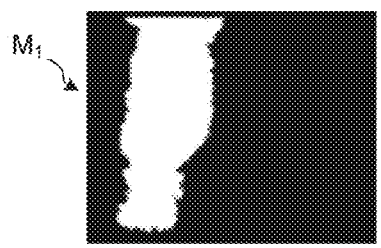  
FIG. 15C  FIG. 15D
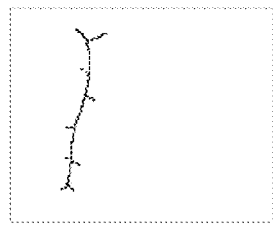  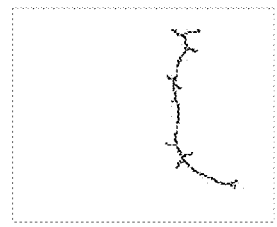
FIG. 15E  FIG. 15F

FOOT TRACKING

FIELD OF THE INVENTION

The present invention relates to foot tracking, and more particularly to an augmented reality display system and method in which the location and orientation of a user's feet are tracked.

BACKGROUND OF THE INVENTION

A prospective purchaser of footwear may wish to see how that footwear would look on them before making a purchase. Trying on shoes is a relatively slow process, often requiring the participation of a sales assistant. It would be desirable to provide a system for permitting a user to see whether footwear would suit them without physically trying on the footwear. Furthermore, it would be desirable for the user to be able to see themselves in the footwear while moving around.

Moreover, many conventional image processing techniques for locating and tracking elements in a scene are not suitable for real-time application in such an augmented reality system. What is desired is a robust technique for efficiently locating and tracking a user's foot or feet within a captured scene.

STATEMENTS OF THE INVENTION

Aspects of the present invention are set out in the accompanying claims. According to one aspect of the present invention, a system for tracking the location and orientation of a user's feet, comprising a depth sensor for generating a depth map of a scene within the field of view of the depth sensor, the field of view containing at least a portion of the user; and a processor, configured to: identify a portion of the depth map as a candidate object for foot tracking, determine a central skeleton representation of the identified portion, determine a location of a toe of the user's foot and a location of an ankle of the user's foot, based on the central skeleton representation, and calculate an orientation of the user's foot based on the determine locations of the toe and the ankle.

Preferably, the location of the ankle is determined by analysing the curvature of the central skeleton representation. The central skeleton representation can be determined by converting the identified portion of the depth map to a binary mask, applying a distance transform to the binary mask, identifying local maxima from the output of the distance transform, and determining a line representation connecting the identified local maxima. The processor can be further configured to determine a projection of the line representation from the binary mask to a corresponding central skeleton representation in the 3D coordinate space of the depth map.

The processor can be further configured to identify a portion of the depth map as a candidate object by removing background portions of the depth map to identify one or more foreground portions. A portion of the depth map can be identified as a candidate object by flood filling the one or more foreground portions to identify discrete segments.

The processor can be further configured to apply predetermined clipping planes to isolate a candidate region of the generated depth map. Two distinct portions of the depth map can be identified as respective candidate objects for foot tracking, and the processor can identify a first portion as the candidate object for the user's left foot and a second portion as the candidate object for the user's right foot, based on predetermined heuristics. Each distinct portion can be processed to identify a toe location and ankle location for the respective candidate object.

The processor can be further configured to determine a floor plane within the depth map, the floor plane representing the plane of a floor upon which the user is standing. An estimate of the orientation of the user's foot can be obtained by calculating the cross product of a toe-ankle vector and the identified floor plane, the toe-ankle vector being a vector connecting the identified toe location and ankle location.

The system can include a plurality of depth sensors provided at different positions with respect to the user, and the processor can be further configured to generate a depth map from respective depth maps received from each of the depth sensors.

A camera can be provided for imaging the scene, the image data generated by the camera having a predetermined relationship to the depth map generated by the depth sensor. The processor can be further configured to overlay a representation of an item of footwear over the image data generated by the camera based on the determined toe location and orientation of the user's foot, and to output the resulting image to a display device.

The processor can be configured to identify the location of the user's toe by determining the lowest point of the candidate object in the capture plane of the depth sensor, and starting from the determined lowest point searching along the edge of the candidate object for a predetermined distance and identifying the point of greatest curvature in the capture plane of the depth sensor as the location of the user's toe. The location of the user's ankle can be identified by following a centre line from the identified toe location along the candidate object in the capture plane of the depth sensor, wherein the centre line is followed for a predetermined distance in 3D from the identified toe location to find the ankle location. The processor can identify a first centre point of a horizontal line spanning the candidate object at a first vertical location a predetermined distance above the identified toe location, set a first search axis which intercepts the toe location and the identified first centre point, determine a further location a predetermined distance along the first search axis from the first centre point away from the identified toe location, identify a further centre point of a line spanning the candidate object in a direction perpendicular to the first search axis, and set a second search axis which intercepts the toe location and the identified further centre point.

The processor can calculate the orientation of the user's foot based on the direction of an axis passing through the identified toe location and the identified ankle location of a candidate object. The processor can be further configured to calculate the orientation of the user's foot based on a major axis determined by principal component analysis of the voxel positions below the identified ankle location within the depth map.

The processor can be further operable to identify, in a calibration frame in which the user is present within the scene, one or more further trackable features of the candidate object, identify, in a subsequent frame, one or more of the further trackable features found in the calibration frame, identify a transformation from the calibration frame to the subsequent frame based on the 3D spatial offset between the location of the same trackable features in the calibration frame and the subsequent frame, and identify the toe and ankle locations, and orientation of the user's foot in the subsequent frame by applying the identified transformation to the toe location and foot orientation determined for the calibration frame.

The processor can be further configured to calculate the orientation of the user's foot based on a weighted average of the estimates made using the toe-ankle vector, principal component analysis and feature tracking. The further trackable features can be represented by 3D positions and corresponding descriptors, the descriptors defining the further trackable features in terms of one or both of the shape of the surface around the 3D position and the colour values and/or intensities of the surface around and including the 3D position.

In another aspect, the present invention provides a computer-implemented method of determining the location and orientation of a user's feet within captured scene data, comprising receiving, from a depth sensor, a depth map of a scene within the field of view of the depth sensor, the field of view containing at least a portion of the user, identifying a portion of the depth map as a candidate object for foot tracking, determining a central skeleton representation of the identified portion, determining a location of a toe of the user's foot and a location of an ankle of the user's foot, based on the central skeleton representation, and calculating an orientation of the user's foot based on the determine locations of the toe and the ankle.

In yet another aspect, there is provided a computer program arranged to carry out the above method when executed by a programmable device.

BRIEF DESCRIPTION OF THE DRAWINGS

Embodiments of the present invention will now be described with reference to the following drawings, in which:

FIG. 5, which comprises

DESCRIPTION OF THE EXAMPLE EMBODIMENTS

Figure 1:
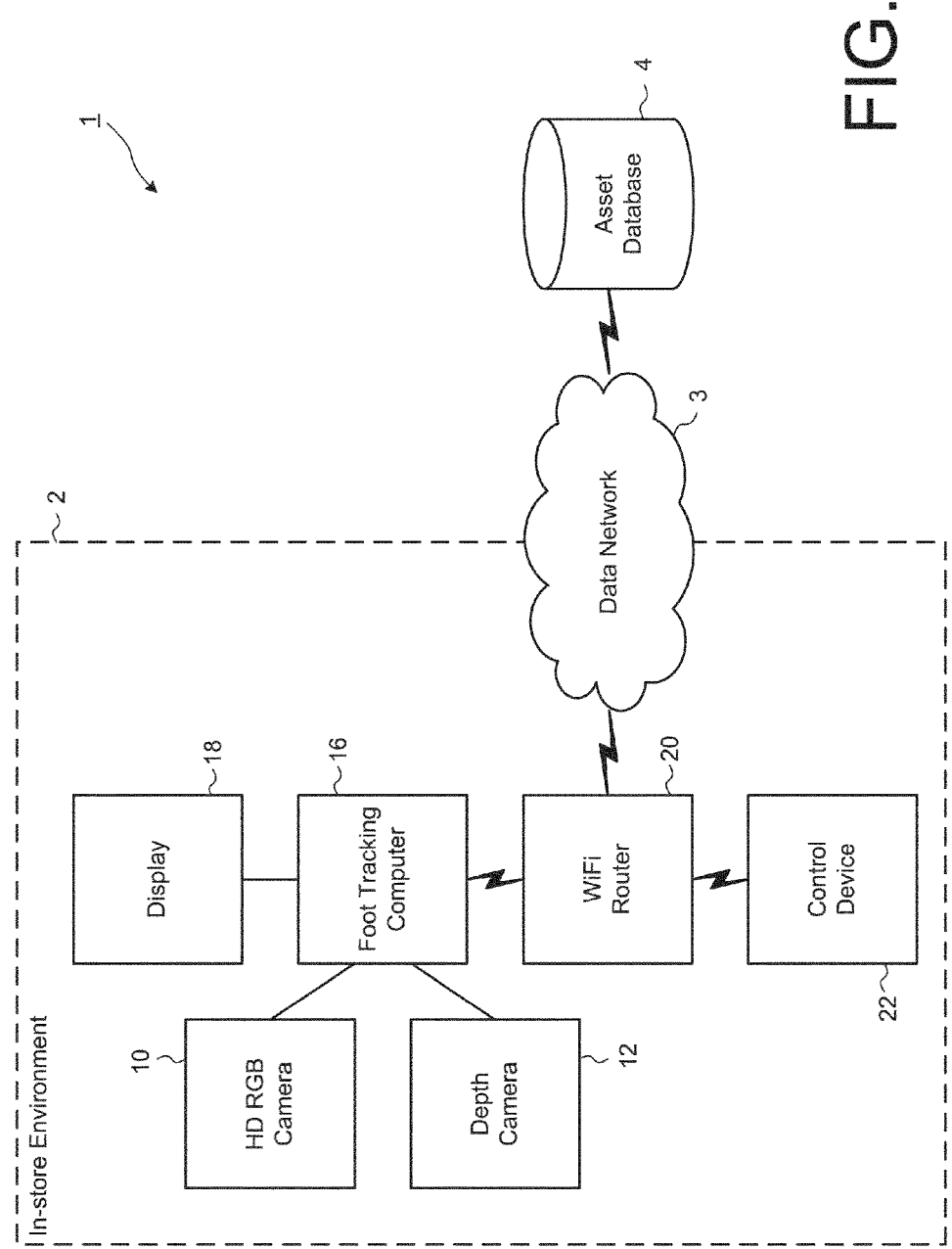
FIG. 1 is a block diagram showing the main components of an augmented reality foot tracking system according to an embodiment of the invention.

In FIG. 1, a deployment model for a foot tracking system 1 is schematically illustrated. The function of the foot tracking system in the present embodiment is to track the position and orientation of a customer's feet in an in-store environment and overlay a suitably positioned and orientated representation of an item of footwear onto an image of the customer, thereby permitting the customer to see what they would look like wearing the footwear without needing to physically try it on. The foot tracking system 1 comprises an in-store environment 2 coupled to a data network 3, such as a Local Area Network, an Intranet, the Internet, etc. The in-store environment 2 comprises a High Definition (HD) RGB camera 10 for capturing video images of a scene containing a customer's feet. The in-store environment 2 also comprises a depth camera 12.

The depth camera 12 comprises a depth sensor and a low resolution RGB camera (not shown) which are pre-calibrated together, such that the depth camera can produce an x, y, z, r, g, b output indicating a position in space (x, y, z coordinates) in voxels (volume elements) and a colour (rgb colour space) of each voxel. In other words, each pixel generated by the RGB camera component of the depth camera has a predetermined correspondence with a given voxel generated by the depth sensor. Note that the depth sensor and camera component need not necessarily have the same resolution, and thus it would be possible for a plurality of pixels to correspond to a single voxel or alternatively for a plurality of voxels to correspond to a single pixel.

In an alternative embodiment, more than one depth camera may be provided for a fuller 3D surface map of the foot; for instance potentially including surfaces relating both to the heel and the toe of the foot simultaneously. It will be appreciated that using a plurality of depth cameras will improve the quality of the 3D map of the customer's feet further, thereby resulting in even greater accuracy in the tracking of the position and the orientation of the customer's feet. Furthermore, multiple depth cameras reduce the likelihood of the toe of one foot being occluded by the other foot, or being oriented in a direction which prevents the depth camera from viewing the toe. This is relevant because the detected toe position is important to various aspects of the present technique. In such an alternative, the plurality of depth cameras can be pre-calibrated together such that a predetermined transform representative of the precalibrated positional and alignment relationship between and first and second depth cameras can be applied to the depth map data generated at one depth sensor to transform it into the co-ordinate space of the depth map data generated at the other depth sensor. An example calibration technique is described below.

The HD RGB camera 10 and depth camera 12 are in communication with an foot tracking computer 16 which both controls the operation of the cameras 10,12 and also receives and processes image and/or depth data from the cameras 10,12. The processing conducted by the foot tracking computer 16 on the received image and depth data is explained in detail below. The result of the processing is a video image of the customer in which the customer appears to be wearing selected items of footwear. A portrait display 18 is provided upon which the video image is displayed to the customer. It will be appreciated that, instead of a video image, a series of static images of the customer could instead be provided. However, the realtime presentation of an augmented reality video image in which the customer can move around "wearing" the selected footwear is desirable.

The HD RGB camera 10 may be arranged to capture a scene containing the entirety of the customer, from head to foot. Alternatively, the HD RGB camera may be arranged only to capture a scene containing the lower portion of the customer's body, thereby providing a close-up view of the feet. In contrast, the depth camera 12 can be arranged to capture only the lower legs and feet of an appropriately positioned customer. This is because only the feet are required to be tracked, and the processing requirements of handling unnecessary data relating to upper portions of the user's body would represent an undue burden. In yet a further alternative embodiment, as will be described in more detail below, the foot tracking computer 16 can be configured to determine and apply clipping planes to the captured depth map data, in order to isolate a candidate region of the depth map that is expected to contain the lower legs and feet.

Figure 2A:
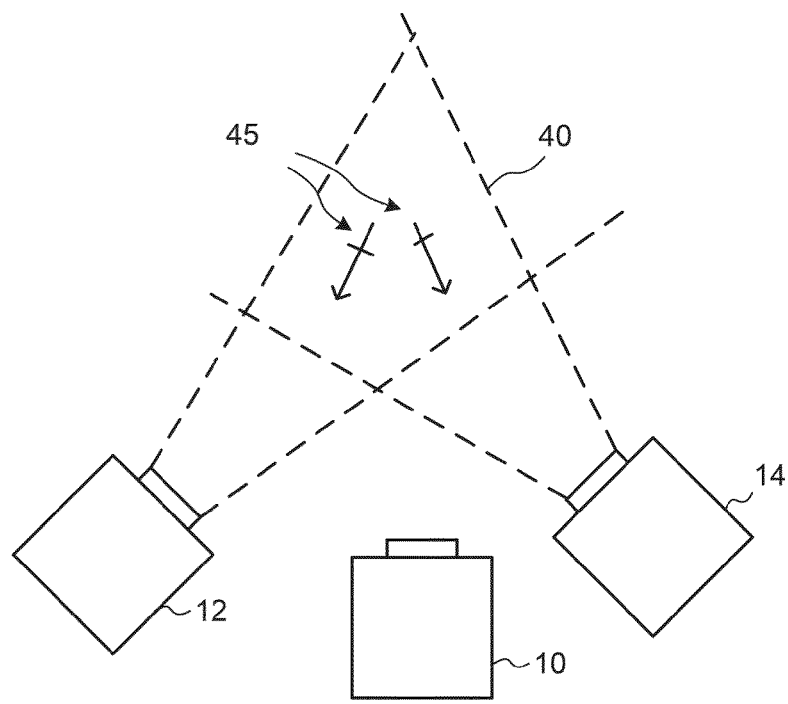
FIGS. 2A and 2B schematically illustrate exemplary plural and single depth camera arrangements according to respective alternative embodiments.
Figure 2B:
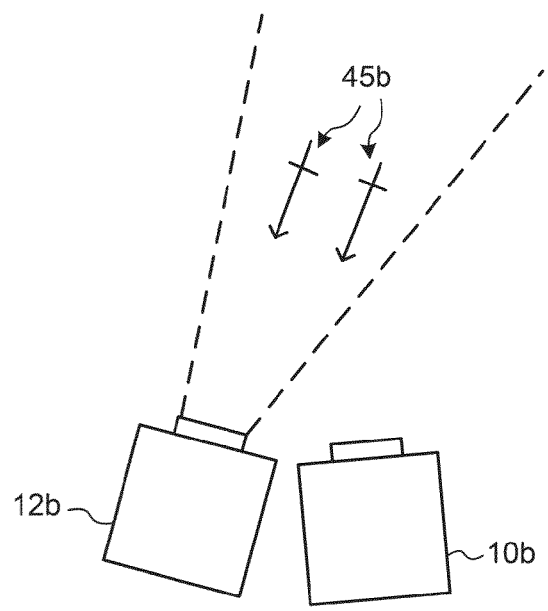

Referring briefly to FIG. 2A, a plan view of an exemplary camera arrangement is provided showing a video camera 10 and a plurality of depth cameras 12, 14. The overlapping area 40 of the respective fields of view of the depth cameras 12, 14 is visible, and in this area a set of floor markings 45 are provided to indicate to the customer where they should place their feet during a calibration phase. The alternative single depth camera arrangement is shown in FIG. 2B, in which an HD RGB camera 10b is provided for imaging the user and one depth camera 12b is provided alongside the HD RGB camera 10b. As can be seen, floor markings 45b are aligned such that the user's toes will be facing the depth camera during the calibration phase. This enables the depth camera 12b to capture at least the portion of the scene including the user's toe and front portion of the foot or respective feet, for optimal results and output from the foot tracking algorithms to be described below. It will be appreciated that the HD RGB camera 10b and the depth camera 12b could be vertically arranged one above the other, instead of the side-by-side arrangement shown in FIG. 2B.

Returning to FIG. 1, a WiFi router 20 is provided which permits a control device 22 to be used to wirelessly issue control commands to the foot tracking computer 16 regarding the image capture and the processing carried out at the foot tracking computer 16. In this embodiment, the control device 22 is a tablet computing device such as an iPad (RTM), but may be any form of mobile device, such as a smart phone, a smart watch, a PDA, a laptop, etc. The control device 22 may be used either by the customer or by a shop attendant. The WiFi router 20 also permits access to the Internet 3, enabling still images or video footage of the customer to be emailed to the customer or uploaded to a social media website. Access to centrally stored footwear information (for example a database 4 of the footwear representations) may also be provided via the Internet 3.

Figure 3:
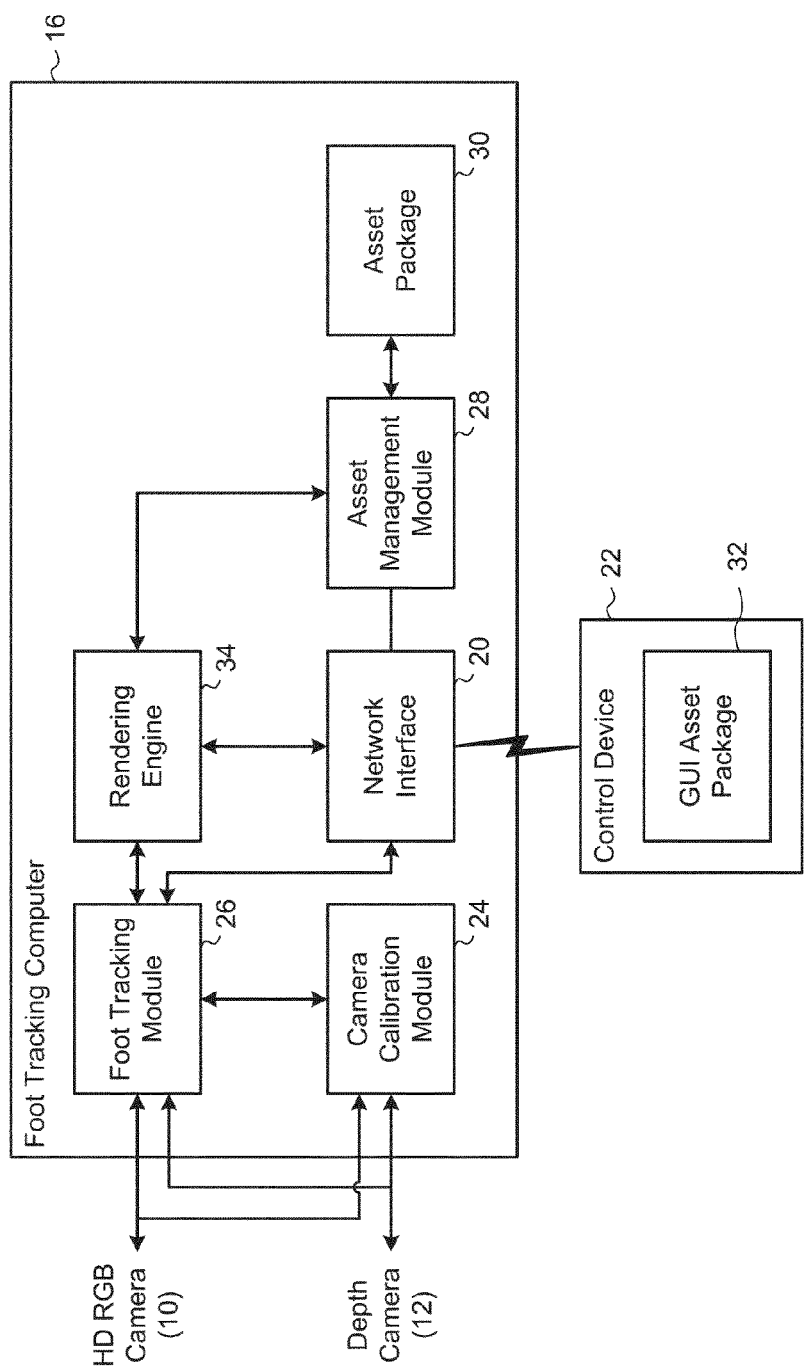
FIG. 3 is a block diagram showing the main processing modules of the foot tracking computer and control device in the system of FIG. 1, according to an embodiment.

Referring to FIG. 3, a component model of a foot tracking system such as the one shown in FIG. 1 is schematically illustrated. The component model shown here also relates to a single depth camera embodiment as described in FIG. 2A. The component model shows the RGB camera 10 and the depth camera 12 of FIG. 1. The depth camera 14 is not shown here, for the sake of clarity, and to emphasise the fact that the use of a single depth camera is envisaged in some embodiments. The depth camera 14 and RGB camera 12 are calibrated by depth/RGB calibration logic 24. The depth/RGB calibration logic calibrates the HD RGB camera with the depth camera by comparing pixel values output from the HD RGB camera with pixel values output by the RGB camera component of the depth camera. More particularly, the HD RGB camera calibration to the depth sensor is performed as follows:

1. The internal parameters (intrinsic) of both the HD RGB camera and the depth camera RGB component are calculated using a series of captured images containing a checker board.

2. The external transform (rotation and translation) between the HD RGB camera and the RGB camera component of the depth camera is calculated using a similar set of captured images (in both camera views simultaneously) of a check board pattern.

Each of the above processes are performed once for the system during installation, and result in transforms which can be applied to map image points within the RGB camera component of the depth camera to corresponding image points within the HD RGB camera. These techniques are well known to the person skilled in the art. The RGB camera component of the depth camera is factory precalibrated to the depth sensor component of the depth camera. Accordingly, by calibrating the HD RGB camera with the RGB component of the depth camera, calibration between the HD RGB camera and the depth sensor is achieved.

Step 2 of this technique can also be used to achieve the necessary pre-calibration between the depth cameras 12, 14. In this case, the internal parameters should be the same (assuming two identical depth cameras are used), and so step 1 is not necessary. The process of step 2 will result in a transform relating the RGB camera components of the depth cameras together. Given that the depth sensor component of a depth camera is factory pre-calibrated to the RGB component of the depth camera it follows that the same transform will also relate the depth sensor components of the respective depth cameras. In an alternative calibration method for the depth cameras, the floor plane could be detected (for example in the manner described below) for each camera as a common feature, and a suitable transform could be determined based on the relative position and orientation of the floor plane in the depth maps from the separate cameras. It will be appreciated that a combination of depth and image based techniques could be used. For example, the depth maps could be used to align the floor planes of the two depth cameras, while the floor markings could be detected visually and used to refine the alignment.

Foot tracking logic 26 is provided to identify the position and orientation of the customer's feet for each image frame based on the images captured by the depth camera. The foot tracking logic 26 searches for the position and orientation of the user's feet in each new frame in a variety of ways, including by looking for certain characteristic features in image areas nearby the position and orientation of the customer's feet in the previous frame. The performance of the foot tracking logic 26 may be improved when the customer moves their feet relatively slowly. The details of the foot tracking logic 26 will be described further below.

A network interface (WiFi router) 20 and control device 22 are also shown in FIG. 3. A GUI asset package 32 is provided as a mobile app which permits the control device 22 to be used to issuing control commands for functions such as selecting items of footwear and footwear size, and initialising and triggering the foot tracking functionality.

An asset management environment 28 is provided which is able to access an asset package 30 providing a database of available footwear (shoe models and textures) for augmented reality presentation. The asset management environment 28 controls the loading of and access to the application assets and in particular provides the logic for selecting a desired item of footwear using the control device 22.

A rendering engine 34 receives an HD RGB image from the RGB camera 10 and a representation of a desired item of footwear from the asset management environment 28, and maps the representation of the desired item of footwear to the received HD RGB image at a position and orientation identified by the foot tracking logic 26. The overall operation of the rendering engine 34 is controlled by the control device 22 via the network interface 20. The rendering engine 34 may be provided with a pre-oriented representation of the desired footwear from the asset management environment 28, or may receive a full 3D model of the desired footwear and generate an appropriate 2D image of the 3D model for display based on the orientation information received from the foot tracking logic 26.

Figure 4:
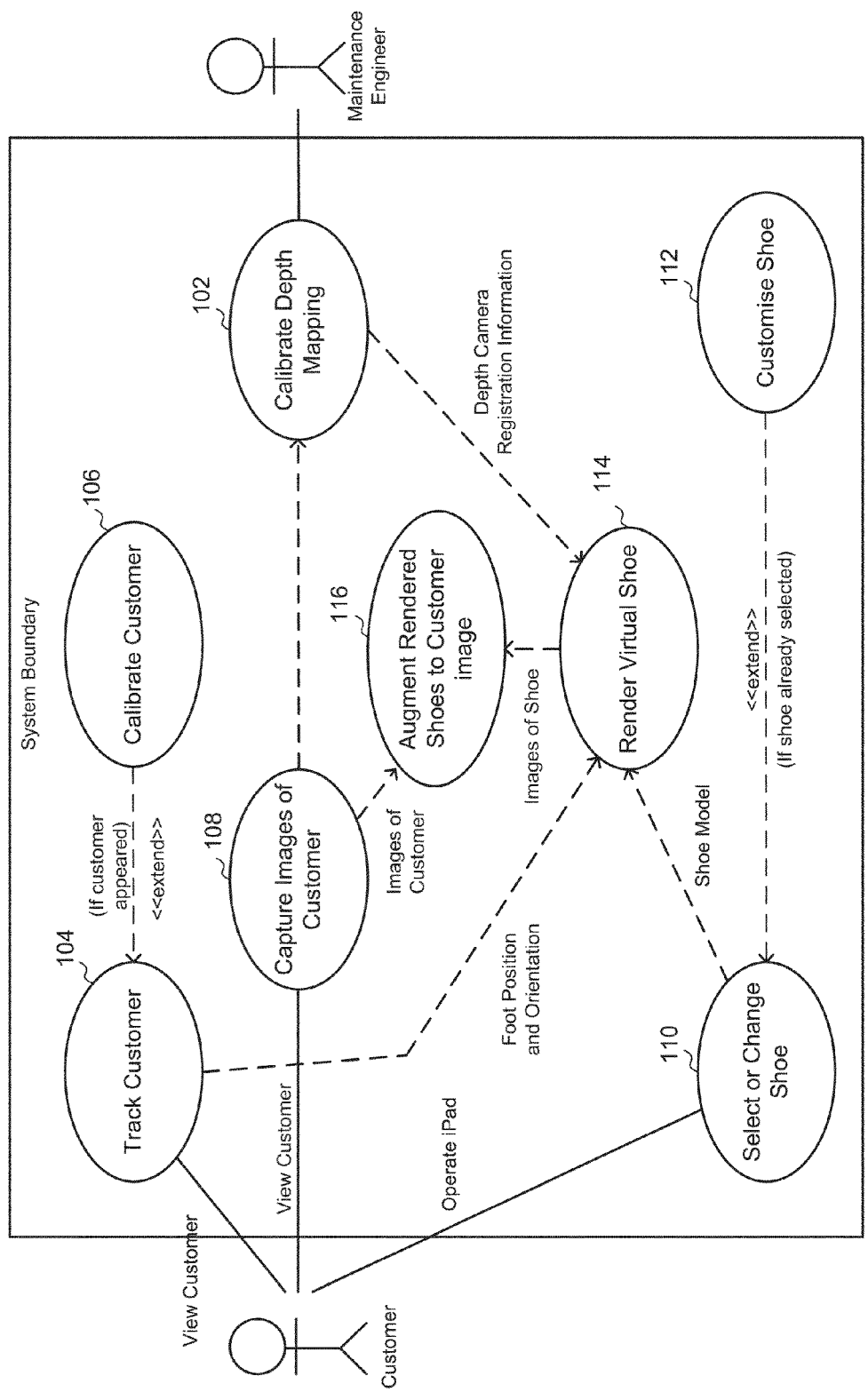
FIG. 4 is a schematic block diagram illustrating exemplary operation and process flows in the foot tracking system according to an embodiment.

In FIG. 4, various operations and processes conducted by the foot tracking system 1 are schematically illustrated. Two types of user are identified; a maintenance engineer, responsible for the correct setup of the system, and a customer. The maintenance engineer is responsible for ensuring that the depth cameras 12 (and optionally 14) are properly calibrated with each other, and with the HD RGB camera 10 (calibrate depth mapping 102). The customer interacts with the system in three main ways. Firstly, the position and orientation of the customer's feet is tracked using the depth cameras (3D position and colour information) by a track customer operation 104. This tracking may occur after the customer has been calibrated with the foot tracking system by standing on the floor markers and triggering the calibrate customer function 106 using the control device 22. Secondly, images of the customer are captured by the HD RGB camera 10 in a capture images of customer function 108. This function is also used when checkerboard images are presented in the field of view of the cameras for the calibrate depth mapping function 102. Thirdly, the user is able to select or change a desired shoe and shoe size (at the control device 22) using a select or change shoe function 110. A slider may be provided for the user to input their shoe size. If a shoe has already been selected, then the user may be provided with the facility to customise the shoe (for example its colour) using the customise shoe function 112. The shoe selection, change and customisation functions 110, 112 result in a shoe model being provided to a render virtual shoe function 114 where images of the shoe are rendered in dependence on the orientation determined by the track customer function 104. An augment rendered shoes to customer image function 116 is provided which receives the depth camera registration information from the calibrate depth mapping function 102, receives the foot position and orientation information from the track customer function 104, receives the images of the customer from the capture images of customer function 108, and receives the images of the shoe generated at the render virtual shoe function 114. An appropriate image of the shoe is then overlaid at an appropriate position on the captured image based on the foot position and orientation information and the registration information. The resulting image is then presented to the customer.

Figure 5A:
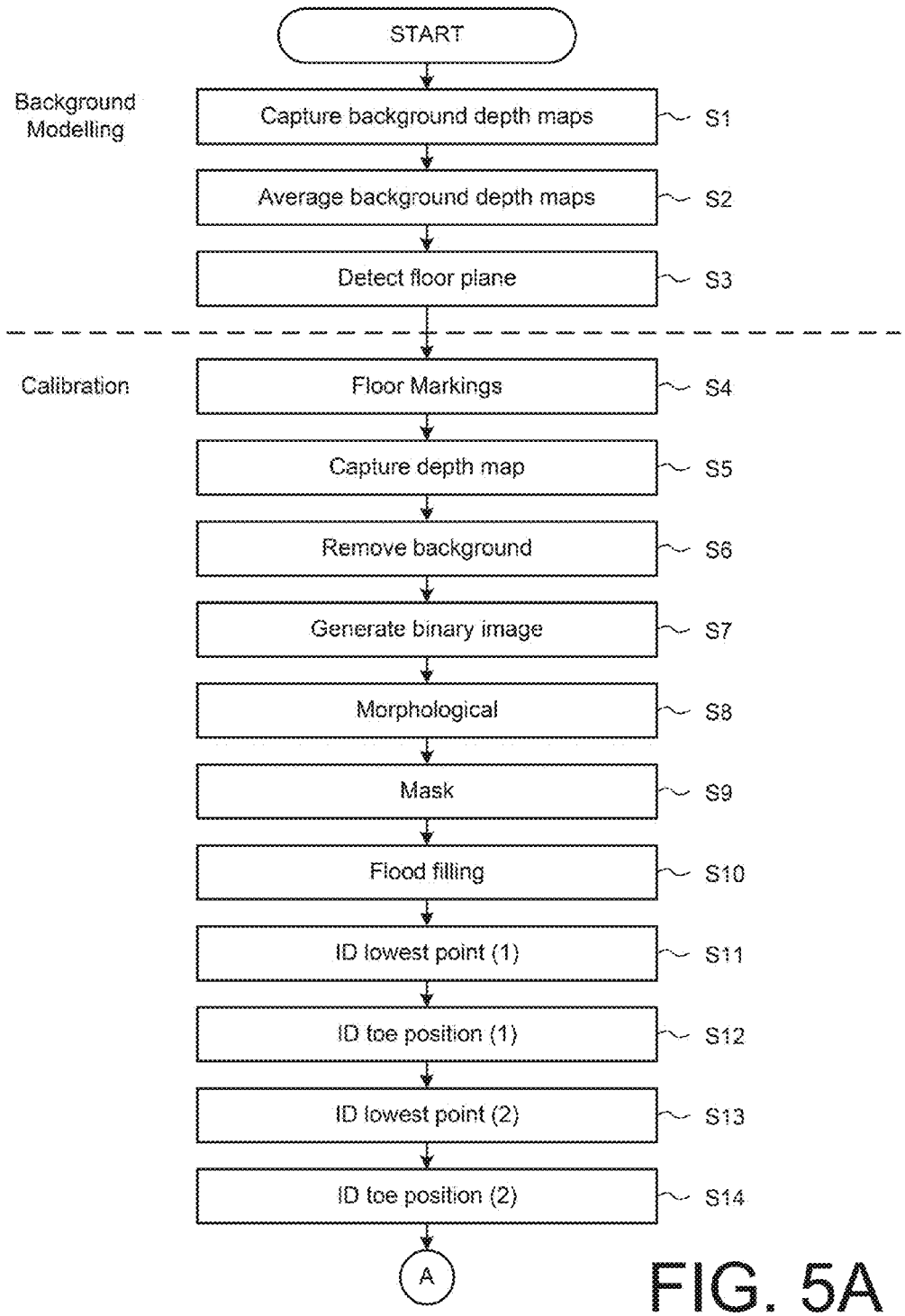
FIGS. 5A, 5B and 5C, is a flow diagram illustrating the main processing steps performed by the system of FIG. 1 for an end-to-end process of background modelling, calibration and real-time foot tracking according to an embodiment.
Figure 5B:
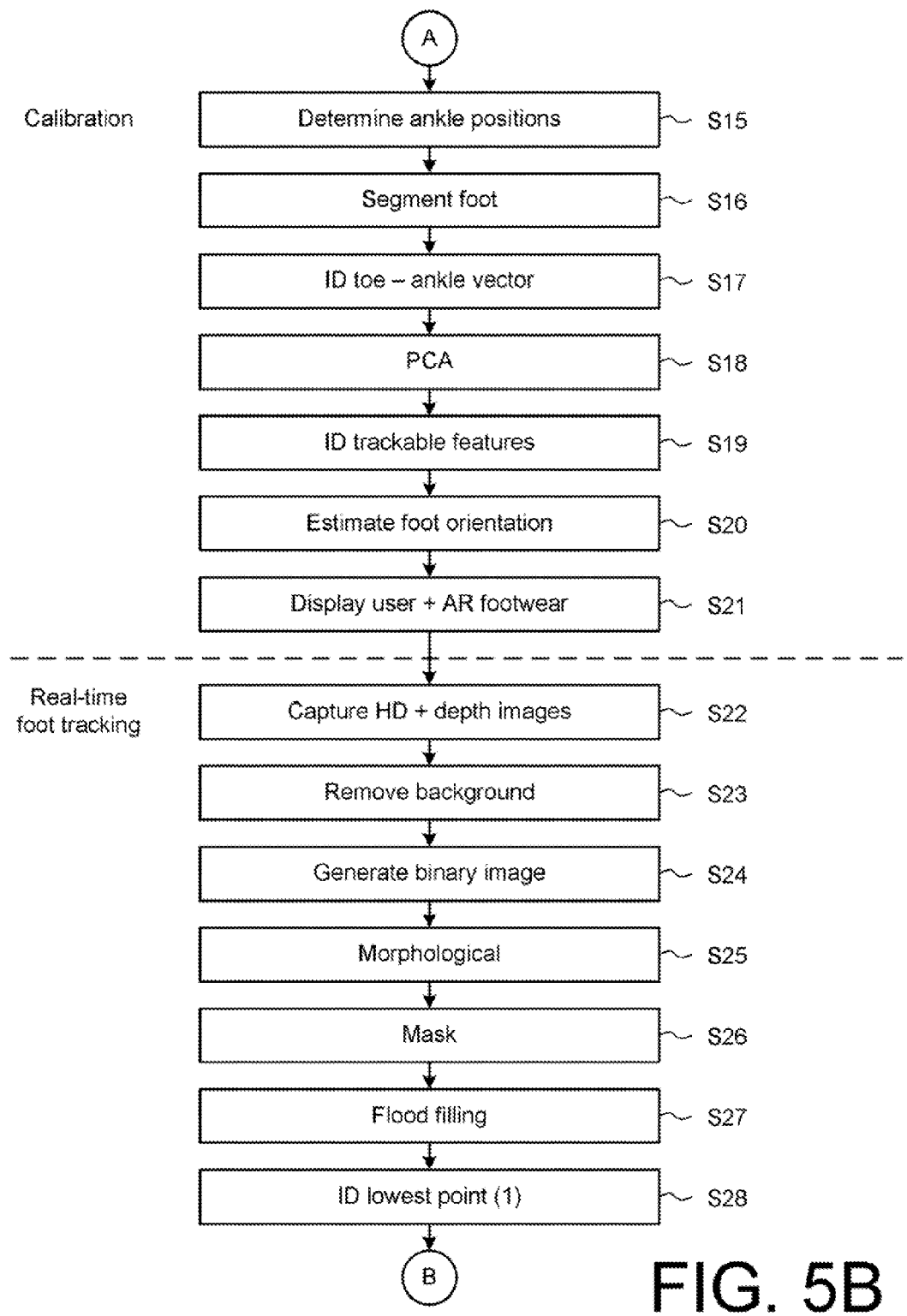
Figure 5C:
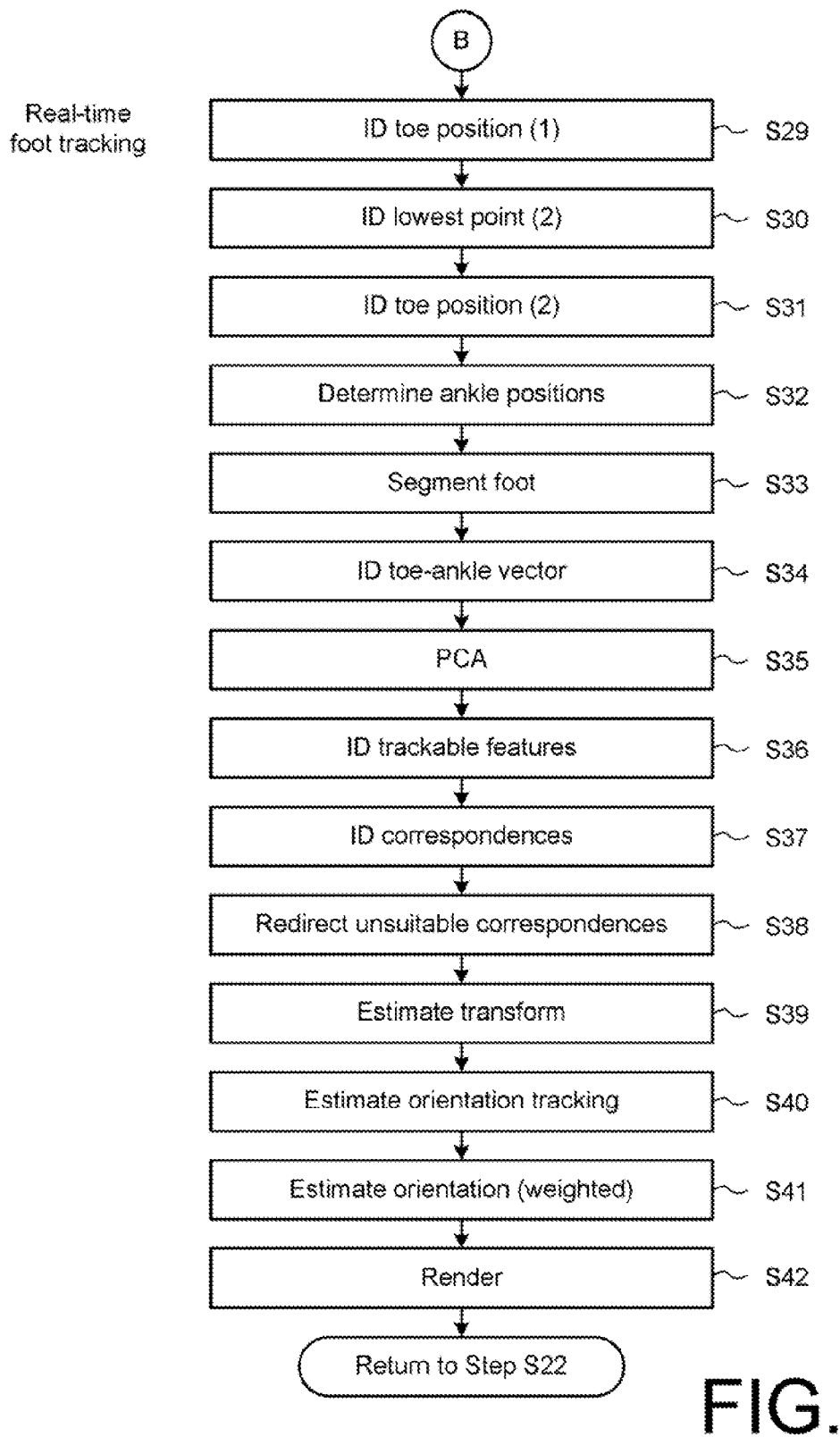

Referring to FIG. 5, a schematic flow diagram of the foot tracking process is shown. The foot tracking process takes place after the installation process during which the cameras have been calibrated together.

Background Modeling/Scene Calibration

In the foot tracking process, at a step S1, a series of background depth maps are captured by the depth camera while the customer is not stood within the field of view of the depth camera. These could be captured over a predefined period of time—for example 10 seconds. The depth maps are processed as greyscale 2D images in which a "grey" value corresponds to a depth (pixel distance) from the depth camera. It will be appreciated that the x, y position of a pixel combined with its depth (z) value together define a voxel (volume) element within the scene within the field of view of the depth camera. A group of adjacent voxels can be considered to define a surface. At a step S2, the captured background depth maps are averaged to form a robust background model. The background model may be generated by adding depth values to a histogram over plural acquired depth maps, the histogram separately storing accumulated depths for each x,y position of the depth map. The histogram values can then be divided by the number of depth maps which contributed to the histogram to derive an average (mean) depth value for each x, y position.

At a step S3, a floor plane is detected from the background model. The floor plane may be detected as the largest planar area (surface) within the field of view of the depth camera. This should be true because, in general, the depth camera will be oriented such that the floor is visible within most, if not all, of the field of view of the depth camera when no user is present. Alternatively, the floor plane may be detected based on the position and orientation of markings on the floor, for example at least three user-specified points located on the floor of the in-store environment 2, the floor markings having a predetermined size and shape known to the foot tracking computer 2.

Foot Calibration

At a step S4, the customer stands on the floor markings, and in particular aligns his or her feet with the position and orientation indicated by the floor markings. As a result, the user will be stood with his toes facing the depth camera (assuming a single depth camera), providing a good view of the toe region of the feet. At this stage the user may select an item of footwear which they wish to "try on", and indicate their shoe size. At a step S5, the depth camera captures a depth map of the customer's legs and feet while the customer is stood on the floor markings. For the purposes of calibration, a plurality of frames may be captured while the user remains standing still on the floor markings, and averaged, to result in a low-noise calibration depth map. At a step S6, background surfaces within the depth map are removed by removing voxels having substantially the same depth (and optionally colour) in both the depth map containing the user and the background model. This can be achieved by referring to a lookup table based on the above background model histogram to remove background scene data within a certain noise level, the noise level being defined by a suitable standard deviation value. Voxels of the depth map having a depth greater in the depth map containing the user than in the background model are also removed.

At a step S7, a binary image is generated from the depth map, in which a pixel having a value of "1" belongs to the foreground and a pixel having a value of "0" belongs to the background. At a step S8, a series of morphological operations are conducted on the binary image to remove holes and noise in the binary image. In particular, one or more erosion operations may be conducted to remove noise (individual foreground pixels or very small groups of adjacent foreground pixels), and then one or more dilation operations may be conducted to reacquire the original edges of large objects and close up any small holes (individual background pixels or very small groups of adjacent background pixels).

At a step S9, the binary image is applied as a mask to the depth map to remove noise from the depth map. This involves removing from the depth map voxels which are present in the depth map but indicated in the binary image to correspond to background, and adding to the depth map voxels which are not present in the depth map but indicated in the binary image to relate to the foreground. A suitable depth value z for the new voxel is selected, which may be a neighbourhood average of the z values of the surrounding pixels.

At a step S10, blobs of neighbouring (adjacent) voxels having at least a predetermined size (in voxels) are retained, while blobs containing fewer voxels than this are removed from the depth map. This removes small blobs and noise from the depth map. This process can be carried out by using flood fill operations.

Figure 6:
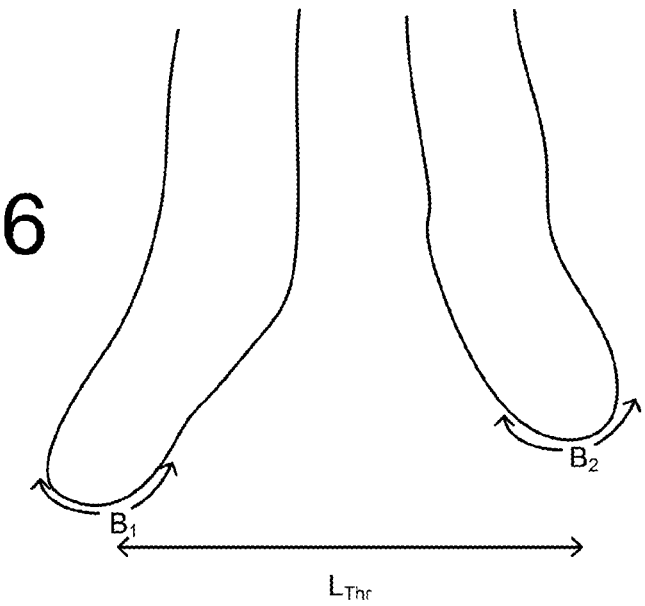
FIGS. 6 and 7 schematically illustrate toe point identification using a silhouette.

At a step S11, a lowest ("y" value") point in the masked 2D depth map (or alternatively in the binary image) is detected. This can be expected to correspond to an area near to the toe of one of the user's feet. At a step S12, an accurate toe position is sought by searching in both directions from the detected lowest point along the edge of the silhouette of the candidate object for a point of greatest curvature (in 2D). The search will continue in each direction for a predetermined distance along the edge of the silhouette from the detected lowest point. The point of greatest curvature on the silhouette of the foot has been found to constitute a good estimate for the position of the toe of a shoe, at a range of foot orientations. At a step S13, a lowest point outside of a predetermined horizontal distance ("x" axis of the 2D depth map) from the lowest point detected at the step S11 is detected. This can be expected to correspond to an area near to the toe of the other of the user's feet. It will be understood that applying a predetermined horizontal distance threshold addresses the problem of another part of the same foot being identified. At a step S14, an accurate toe position is sought on the second foot by searching in both directions from the detected lowest point along the edge of the silhouette of the candidate object for a point of greatest curvature in like manner to the step S12. The above process is shown schematically in FIG. 6, in which the two lowest points $B_1$ and $B_2$ greater than $L_{Thr}$ pixels apart in the horizontal (x) direction are found and each constitute a start point for a search along the silhouette in both directions for a point of greatest curvature.

Figure 7:
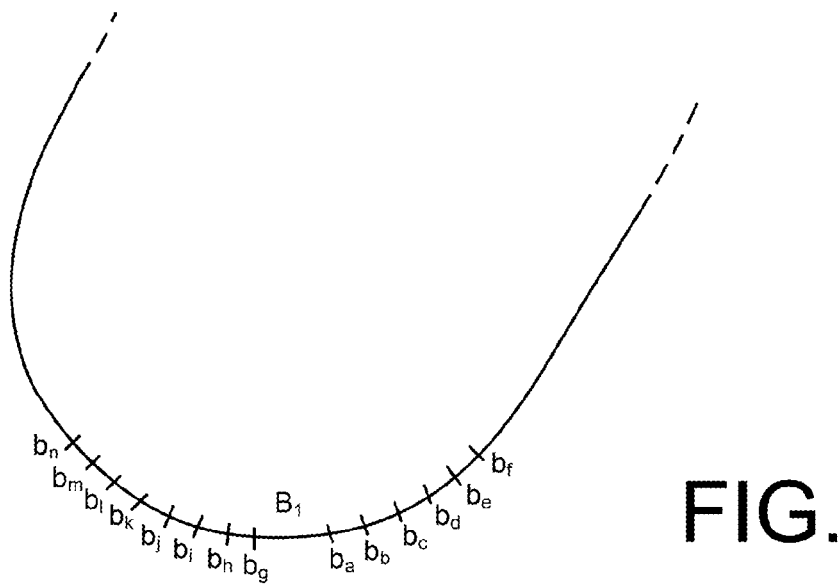

One way of performing the curvature analysis may comprise repeatedly selecting a different set of three points along the silhouette starting from the point X1 and X2, calculating the angle between the vector joining one adjacent pair of the three points and the vector joining the other adjacent pair of the three points, and storing the calculated angle in association with the centre one of the three points, and identifying the point of maximum curvature from the storied angles associated with different positions along the detected front portion of the leg and foot. Referring to FIG. 7, this would result in a set of angles each associated with one of the positions $B_1$, $b_a$, $b_b$, $b_c$, $b_d$, $b_e$, $b_f$, $b_g$, $b_h$, $b_i$, $b_j$, $b_k$, $b_l$, $b_m$ and $b_n$. For example, the angle associated with the position B1 would be calculated from the dot product between the x, y axis vector (ignoring depth) from $b_g$ to $b_1$ and the x, y axis vector from $B_1$ to $b_a$. The position having the largest calculated angle is then treated as the true toe position. The 3D position in space of the toe can then be determined from the x, y, z information associated with the pixel at the true toe position. It will be appreciated that alternative techniques for analysing 2D curvature could be used instead.

At a step S15, the position of the user's ankle is determined for each foot/leg. This is achieved by, starting at the toe positions identified in the steps S12 and S14, following a centre line (2D centroid) along the silhouette of the candidate object (in the 2D depth map or binary image) for a predetermined distance (in 3D).

Figure 8:
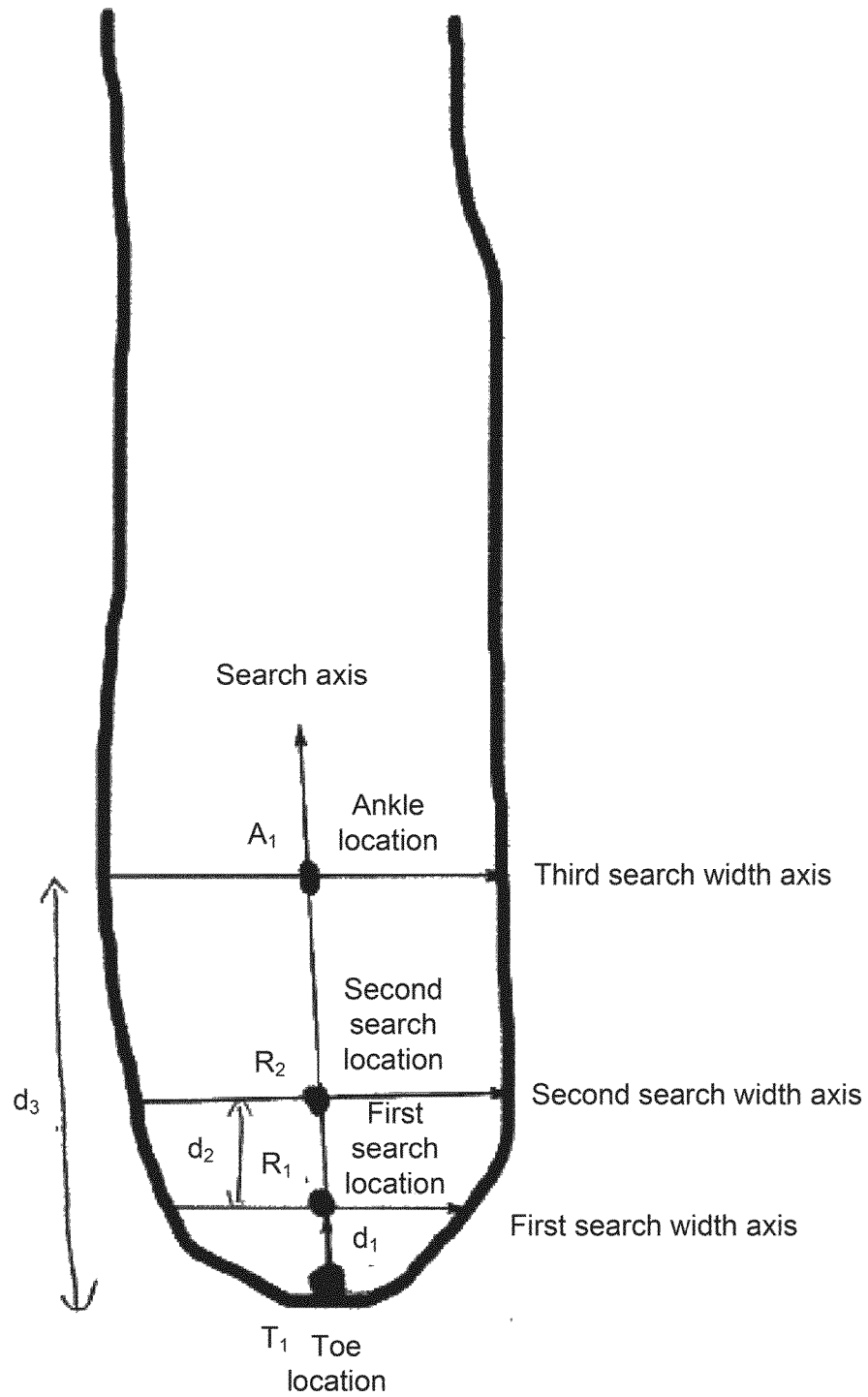
FIG. 8 schematically illustrates a front view of a candidate object being subject to ankle detection.

Referring to FIG. 8, a view of a candidate object (user's foot and part of the lower leg) is schematically illustrated in which a toe location $T_1$ has already been identified in accordance with the above method. The view of the candidate object is looking downwards and directly towards the front of the foot. The following process is conducted in relation to the 2D depth map or the binary image. A first search location $R_1$ at the centre of a horizontal line a predetermined distance $d_1$ vertically (y axis) above the toe location is identified, and a search axis is set to pass through the first location $R_1$ and the toe location $T_1$. The predetermined distance $d_1$ may for example be 10 pixels. Then, a second search location $R_2$ is set at the centre of a line perpendicular to the search axis a predetermined distance $d_2$ along the search axis. The search axis is refined if necessary to pass through the second search location $R_2$ and the toe location $T_1$. This process continues until a predetermined distance $d_3$ (in 3D) from the toe location $T_1$ has been reached, and point reached at this point is considered to be the outer ankle location $A_1$. This distance may be approximately 15 cm. The current distance from the toe location is determined each time a new search location is identified by calculating the distance in 3D space between the x, y, z position of the toe location $T_1$ and the x, y, z position of the new search location. The outer ankle location in 3D is then determined based on the x, y position of the identified outer ankle position in the depth map and the depth value associated with that x, y position.

Figure 9:
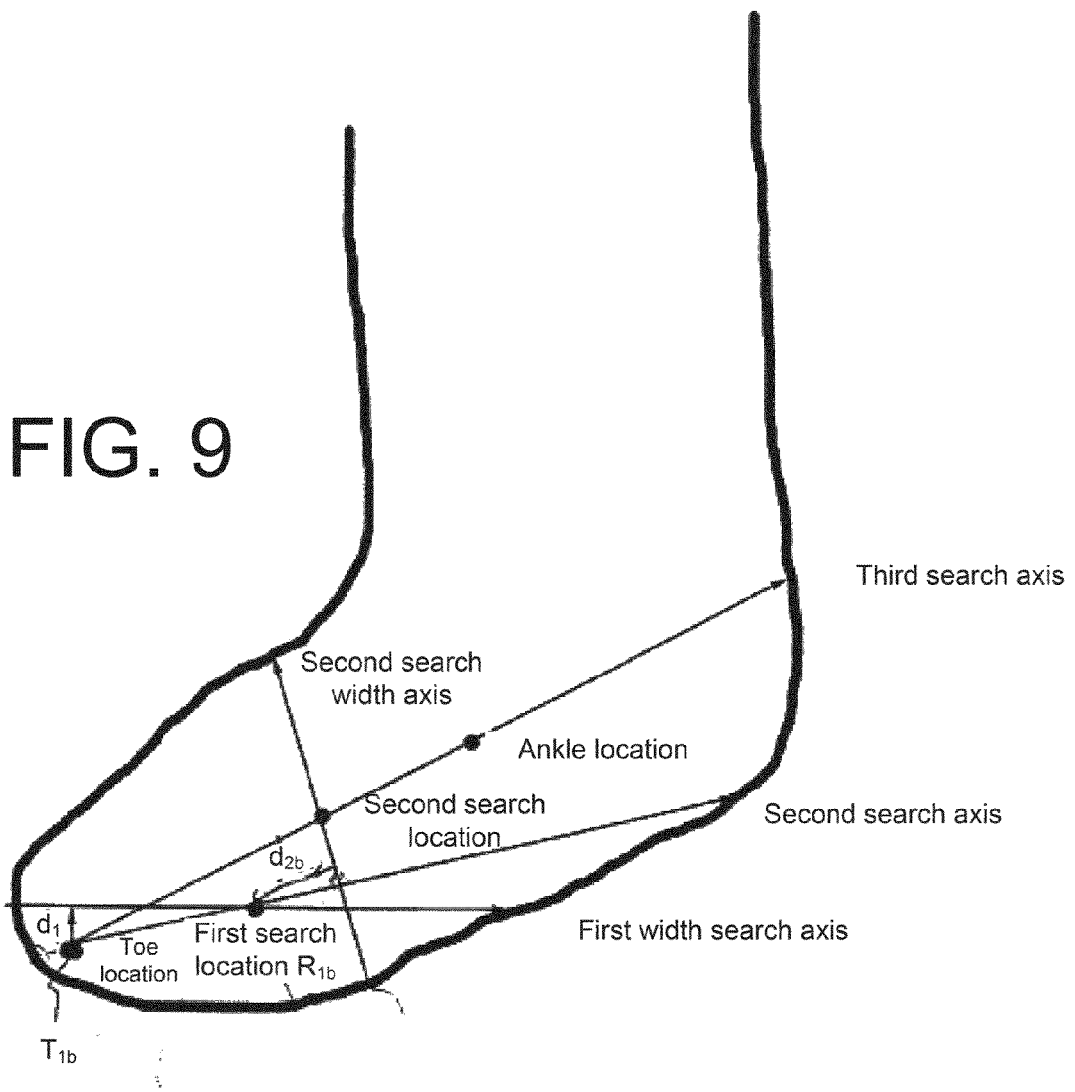
FIG. 9 schematically illustrates an oblique view of a candidate object being subject to ankle detection.

Referring to FIG. 9, a view of a candidate object (user's foot and part of the lower leg) is schematically illustrated in like manner to FIG. 8, but at a different orientation with respect to the depth camera. In the object of FIG. 9, a toe location $T_{1b}$ has already been identified in accordance with the above method. The following process is conducted in relation to the 2D depth map or the binary image. A first search location $R_{1b}$ at the centre of a horizontal line (first width search axis) a predetermined distance $d_1$ vertically (y axis) above the toe location is identified, and a second search axis is set to pass through the first location $R_{1b}$ and the toe location $T_1$. The predetermined distance $d_1$ may for example be 10 pixels. Then, a second search location $R_{2b}$ is set at the centre of a line (second search width axis) perpendicular to the second search axis a predetermined distance $d_{2b}$ along the search axis. The search axis is refined to pass through the second search location $R_{2b}$ and the toe location $T_{1b}$. This process continues until a predetermined distance $d_3$ (in 3D) from the toe location $T_{1b}$ has been reached, and point reached at this point is considered to be the outer ankle location $A_{1b}$. The outer ankle location in 3D is then determined based on the x, y position of the identified outer ankle position in the depth map and the depth value associated with that x, y position.

It will be appreciated that the distance from the toe to the ankle will differ depending on the size of the user's shoes/feet. It may be sufficient to use a fixed predetermined value for all users. This is because, while a predetermined distance may not always land on the ankle, it can be expected to be a consistent point on the foot towards the ankle. However, improved performance may be achievable by using a distance which depends on the size of the user's feet. This size could be derived from the shoe size measurement entered manually by the user as mentioned above.

It will also be appreciated that while the process described in relation to FIGS. 8 and 9 should result in both cases with an ankle position which corresponds with the user's ankle, the position will relate to a different part of the foot in each case. More specifically, in FIG. 8 (front on) the ankle position will relate to a position at the front of the ankle while in FIG. 9 (side view) the ankle position will relate to the side of the ankle. Accordingly, a correction is made to determine an "inner" ankle position which should be common (or closer to common) irrespective of foot orientation.

Figure 10:
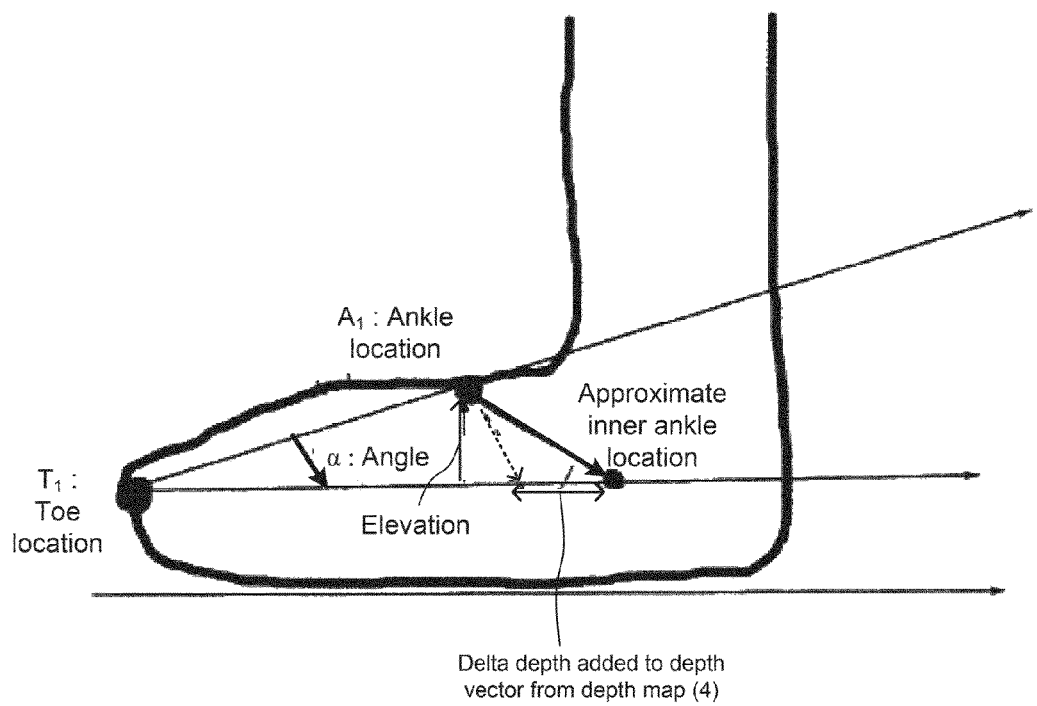
FIG. 10 schematically illustrates an outer to inner ankle compensation step.

Referring to FIG. 10, a geometry for determining an inner ankle location is schematically illustrated. The view shown in FIG. 10 is not a depth map captured by a depth camera but a visualisation of how the toe and outer ankle location of FIG. 8 can be used to determine an inner ankle location. Accordingly the toe location $T_1$ and ankle location $A_1$ of FIG. 8 are shown on FIG. 10. An inner ankle location $A_I$ is also shown. As can be seen from FIG. 10, the inner ankle location $A_I$ is found by rotating a vector joining the toe location and outer ankle location by an angle a downwards (towards the floor plane) and adding a distance $\Delta$ from the toe location. This rotation and distance are set such that the resulting vector between the toe position and the inner ankle position can be expected to be aligned with the longitudinal axis of the foot. Fixed values for a and $\Delta$ could be used, or alternatively the values could be based on the orientation of the foot to compensate for the fact that the ankle is not perfectly cylindrical. In other words, a shallower angle and greater distance may be used when viewing the front of the foot than when viewing the side of the foot. The orientation of the foot for this purpose could be assumed to align with the floor markings for the purposes of the calibration frame. When the process is carried out on subsequent frames where the user may not be stood on the floor markings, then the orientation for the purposes of selecting a suitable value for the angle and distance values may be based on the orientation of the foot during the previous frame (on the assumption that the foot will not have moved very much between two frames) and/or on the basis of the orientation determined by principal component analysis or feature tracking (see below)).

Figure 12:
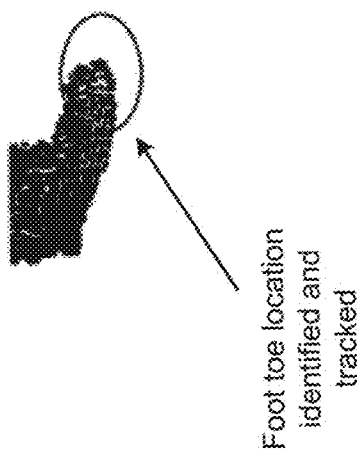
FIG. 12 schematically illustrates a depth map after foot segmentation.
Figure 11:
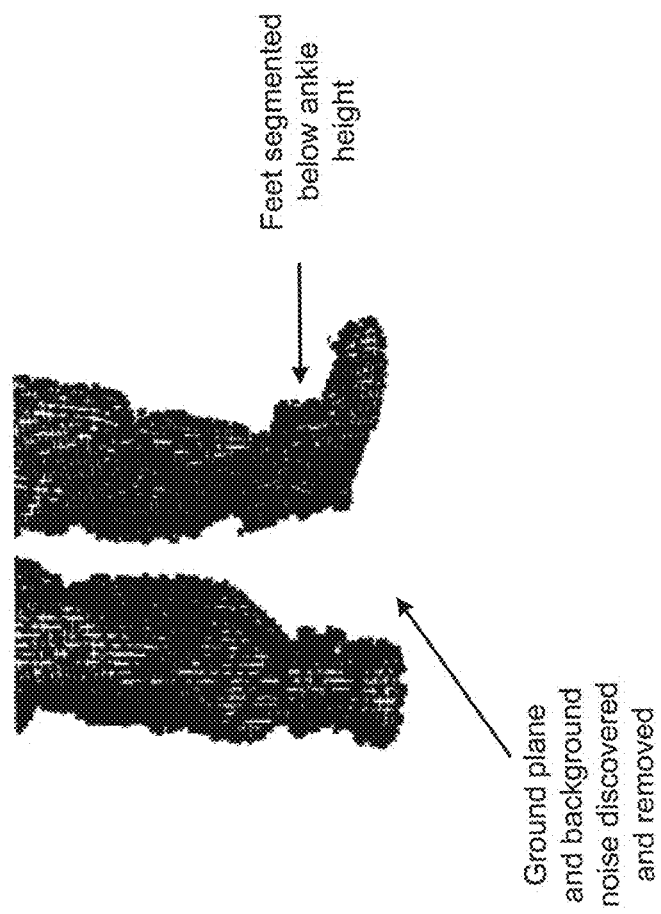
FIG. 11 schematically illustrates a depth map prior to foot segmentation.

At a step S16, voxels of the candidate object above the identified position of the ankle are removed, leaving voxels representing only the customer's foot. A depth map before this segmentation step is schematically illustrated in FIG. 11, where the point at which the feet are to be segmented is indicated, and in which the ground plane and the background noise are shown to have been discovered and removed. A segmented foot is shown in FIG. 12. The segmentation of the foot from the leg is conducted separately in relation to each foot (since the ankle may be at a different height for each foot, for example when the user is lifting one of their feet off the floor). The ankle position used for this purpose may be the "outer" ankle position or the "inner" ankle position.

The voxels removed may be those having a "y" value in the greyscale 2D depth map greater than the "y" value of the ankle position. Alternatively, the voxels removed may be those at a height above the floor plane (in a direction perpendicular to the floor plane) greater than the height of the ankle position above the floor plane. The segmentation of the foot from the leg does not need to be of high accuracy and removing a small portion of the foot in addition to the leg will not have a substantially deleterious impact on the subsequent determination of the position and orientation of the foot. More important is that the user's legs are removed from consideration, as their presence may reduce the accuracy of the position and orientation estimation and increase the amount of processing required (because more data would be considered).

At a step S17, the direction of a vector joining the identified toe position and the identified inner ankle position is identified, providing an estimate of the orientation of the user's foot. The vector can be calculated from the x, y, z values of the identified toe position and the x, y, z values of the identified ankle position. This is conducted for each foot. If the foot is flat on the ground, the orientation can be expected to be parallel to the floor plane. If the heel of the foot is raised, the orientation can be expected to be upwards from the floor plane from the toe position. The orientation also defines the direction the foot is facing within a plane parallel with the floor.

At a step S18, the remaining voxels of each candidate object (representing only the foot) are subject to principle component analysis. This will identify the axis of greatest variance in each of the user's feet (each foot corresponding to a candidate object), which will be indicative of the longitudinal axes of the feet. The principal component axis found in this way can be expected to be closely aligned with the longitudinal axis of the foot when the foot is viewed either front-on (looking down and forwards towards the toe and upper front surface of the foot), or side-on (looking down and towards the side of the shoe from toe to heel). Between these two extremes the principal component axis may deviate more from the longitudinal axis of the foot, but can be expected still to provide a suitable estimate. As will be discussed below, in some embodiments the prominence of the principal component analysis estimate may be de-emphasised for some foot orientations. The prominence of the principal component analysis estimate may also be de-emphasised in certain other situations, such as where a significant portion of the candidate object is obscured (for example by the other candidate object), reducing the number of voxels which the principal component analysis is able to use, thereby reducing the accuracy of this measure. The orientation may be represented for example as a direction vector, a rotation matrix or a set of Euclidian angles.

In some cases where it is not possible to obtain an accurate estimate of orientation using principal component analysis, an estimate of the orientation of the user's foot is obtained by calculating the cross product of the toe-ankle vector and the identified floor plane.

Optionally, at step S19, additional trackable features of the foot can be identified. The trackable features may be either or both of shape features (e.g. surface curvature) and visual features (colour and/or intensity). Algorithms for identifying trackable features of shape and/or colour are well known to the skilled person. For example, the paper "Good Features to Track" by Shi and Tomasi (IEEE Conference on Computer Visiion and Pattern Recognition, Seattle, Jun. 1994) provides a good overview. The Point Cloud Library (see docs.pointclouds.org/trunk/index.html) provides software routines for identifying trackable features see, for example, documentation at docs.pointclouds.org/1.7.0/ classpcl_1_1_f_p_f_h_estimation_o_m_p-members.html for a routine which creates estimated fast point feature histograms for a cloud of points in 3D space. As will be appreciated, the depth map of the user's foot is a representation of such a point cloud. This algorithm picks out 3D surface features which are distinctive and therefore suitable for tracking. Each feature picked out is stored as a location (x, y, z) and a corresponding signature. The signature characterises the 3D surface feature. A similar process can be used to select distinctive colour features, such as at a colour boundary (see "Good Feature to Track", referenced above, for examples). While suitable features could be sought throughout the entirety of the cloud of points representing the user's foot, preferably the search area is limited to an area within a predetermined range of the identified toe location. This serves to reduce the amount of processing required (and thus the time required to complete the feature search), while concentrating on the region of greatest interest. Any number of features may be identified. For example, this process may pick out 200 features, some of which are surface curvature features and some of which are colour intensity features. In addition to the toe region, additional search areas could be defined—particularly where multiple depth cameras are used to provide improved all-round coverage of the foot. For example, a region around the heel (identified for example as the further point from the toe position, or based on an interception between the axis identified by the principal component analysis and the outer edge of the candidate object) could be identified and set as the centre of a search region. Similarly, areas along the side or top of the foot could be identified and used for this purpose.

At a step S20, an orientation for the user's foot in the calibration frame is determined based on a weighted average of the vector joining the identified toe and inner ankle location determined at the step S17, and the axis identified by principal component analysis in the step S18. Optionally, a further element to the weighted average may be the alignment of the floor markings—on the assumption that the user has started off by aligning their feet with the floor markings. The weighted average may give equal weight to each of these (two or three) elements, or may weight the elements differently. The weighting may be fixed, or alternatively it may be made to vary depending on orientation (for example the principal component analysis may be less accurate at certain orientations as discussed above, and thus might have a lower weighting in such cases). Other factors might also influence the weightings used. As an example, a Kalman filter with appropriate weightings maybe used to combine the various estimates of orientation into a single estimate.

At a step S21, the calibration phase is complete. The user may be provided with a message on a display indicating that they are now able to move about. A high definition image of the user is captured, and an augmented reality shoe selected by the user at the step S1 is rendered at an orientation which is based on the weighted average orientation determined at the step S20, and at a position based on the identified toe position. Conveniently, the toe position of the augmented reality footwear can be made to coincide with the identified toe position. The size of the rendered footwear is based on the shoe size selected by the user at the step S1.

Real-Time Foot Tracking

The steps above relating to calibration need not be conducted in real time. Once the calibration frames have been captured, they can be processed in non-realtime, which makes it possible for more complex and intensive processing to be conducted, particularly in relation to the feature detection at the step S20. The feature tracking process (described below) always refers back to the calibration frame, and so the better the set of trackable features identified in the calibration phase, the greater the likelihood of finding those features again in subsequent frames. In contrast, after calibration has been completed, the processing of future frames is to be conducted in real-time.

The processing starts at a step S22, with the capture of an HD image from the camera, and the capture of a depth map (and colour image) from the depth camera, in a similar manner to the step S5 (except that only a single depth map is captured). At a step S23, background surfaces are removed using the background model, in like manner to the step S6. At a step S24, a binary image is generated from the depth map, in like manner to the step S7. At a step S25, morphological operations are conducted on the binary image, in like manner to the step S8. At a step S26, the binary image is applied as a mask to the depth map from which it was derived, in like manner to the step S9. At a step S27, blobs of neighbouring (adjacent voxels) having at least a predetermined size are retained, while blobs containing fewer voxels from this are removed from the depth map, in like manner to the step S10. At a step S28, a lowest point in the masked 2D depth map (or the binary image) is detected, in like manner to the step S11. At a step S29, an accurate toe position is sought in like manner to the step S12. At steps S30 and S31, a toe position for the other foot is determined in like manner to the steps S13 and S14. At a step S32, the position of the user's ankle for each foot is determined in like manner to the step S15. At a step S33, the user's feet are segmented from the legs, in like manner to the step S16. At a step S34, for each foot, the direction of a vector joining the identified toe position to the identified inner ankle position is identified in like manner to the step S17. At a step S35, principal component analysis is carried out (for each foot) on the segmented foot in like manner to the step S18. As with the step S18, in some cases where it is not possible to obtain an accurate estimate of orientation using principal component analysis, an estimate of the orientation of the user's foot is obtained by calculating the cross product of the toe-ankle vector and the identified floor plane.

At a step S36, trackable features of the foot are identified, again within a predetermined range of the identified toe position. This step is similar to the step S19, but different parameters are likely to be used in order that processing can be conducted in real time. For example, a lower search radius (fewer neighbours) may be used in the FPFH algorithm in the real-time tracking phase in order that the processing can be conducted sufficiently quickly.

At a step S37, possible correspondences between the FPFH signatures determined at the step S20 (source cloud) and S36 (target cloud) are identified. An example algorithm for providing this function is defined at docs.pointclouds.org/trunk/classpc111registration 11 correspondence estimation.html. Effectively, this step compares each of the signatures identified at the step S36 with each of the signatures identified at the step S 19 to look for matches (identical or similar signatures).

At a step S38, unsuitable correspondences are rejected. An example algorithm for providing this function can be found at docs.pointclouds.org/1.7.0/classpcl1_1registration_1_1 _correspondence_rejector_one_to_one.html. This is achieved by assuming that the amount of movement between successive frames is small, and looking for features which occur, in a similar position, in successive frames. Features which appear suddenly can be ignored.

At a step S39, a transform is estimated from the correspondences between features in the calibration frame and features in the current frame. An example algorithm for providing this function can be found at docs.pointclouds.org/1.0.0/claspl1_1registration_1_1_transformation_estimation.html. This step can be conducted by Monte Carlo analysis; by identifying a transform (translation and rotation) which best maps features of the current frame to corresponding features from the calibration frame. The transform identified in this way is indicative of a change in orientation of the user's foot with respect to the calibration frame. Optionally, the transform can be tested by considering if it accurately represents the difference in position of the identified toe position between the calibration frame and the current frame. In this sense the toe location (which is assumed to be relatively accurate) can be used to authenticate the accuracy of the feature tracking measure. If the feature tracking is found to be inaccurate by this measure then the estimate of orientation resulting from the feature tracking could either be disregarded, or de-emphasised by reducing its weighting (see below).

At a step S39, a transform is estimated from the correspondences between features in the calibration frame and features in the current frame. An example algorithm for providing this function can be found at [http://docs.pointclouds.org/1.0.0/classpcl_1_1registration_1_1_transformation_estimation.html]. This step can be conducted by Monte Carlo analysis; by identifying a transform (translation and rotation) which best maps features of the current frame to corresponding features from the calibration frame. The transform identified in this way is indicative of a change in orientation of the user's foot with respect to the calibration frame. Optionally, the transform can be tested by considering if it accurately represents the difference in position of the identified toe position between the calibration frame and the current frame. In this sense the toe location (which is assumed to be relatively accurate) can be used to authenticate the accuracy of the feature tracking measure. If the feature tracking is found to be inaccurate by this measure then the estimate of orientation resulting from the feature tracking could either be disregarded, or de-emphasised by reducing its weighting (see below).

At a step S40, an estimate for the orientation of the user's foot is determined based on the rotation component of the transform identified at the step S39. In particular, the orientation is obtained by applying the rotation determined at the step S39 to the orientation determined at the step S20.

At a step S41, an orientation for the user's foot in the current frame is determined based on a weighted average of the vector joining the identified toe and inner ankle location determined at the step S34, the axis identified by principal component analysis in the step S35, and the orientation estimated by feature tracking at the step S40. The weighted average may give equal weight to each of these elements, or may weight the elements differently. The weighting may be fixed, or alternatively it may be made to vary depending on orientation (for example the principal component analysis may be less accurate at certain orientations as discussed above, and thus might have a lower weighting in such cases). Other factors might also influence the weightings used. As an example, the three elements could be weighted differently over time according to their perceived reliability. The PCA measure may not be considered reliable at oblique angles or where the foot is partially obscured, while the feature tracking may be determined to be inaccurate by way of the technique described at the step S39. A Kalman filter with appropriate weightings may be used to combine the various estimates of orientation into a single estimate.

At a step S42, the augmented reality shoe is rendered at an orientation which is based on the weighted average orientation determined at the step S41, and at a position based on the identified toe position. As explained above, the augmented reality shoe may not be rendered at all if there is a lack of confidence in the toe location (e.g. toe is obscured) or in the orientation (e.g. the various measures for estimating orientation all disagree). This avoids unnatural rendering of the shoe.

The process then reverts back to the step S23, for capture and processing of the next image frame and depth map.

Candidate objects corresponding to different feet/legs may be discriminated from each other and considered separately based either on their separation in the x,y plane of the depth camera, or based on their separation in the z plane of the depth camera (this will be the case where one foot/leg partially obscures the other, in which case the depth information is required in order to distinguish between the feet/legs in the depth maps).

Further Embodiment

A further embodiment will now be described using corresponding reference numerals to those of preceding figures where appropriate for corresponding elements. The operation of the foot tracking computer 16 in this embodiment will be given with reference to the flow diagrams of FIGS. 13 and 14. Reference is also made to FIGS. 15A and 15B, schematically illustrating an example of captured and processed depth data by the foot tracking computer 16 in this embodiment.

In this alternative embodiment, foot calibration is not required. Thus, a more robust foot tracking system is provided, which can efficiently locate and track a user's left and right foot from captured image video camera, using a single depth camera.

Background Modeling/Scene Calibration

Figure 13:
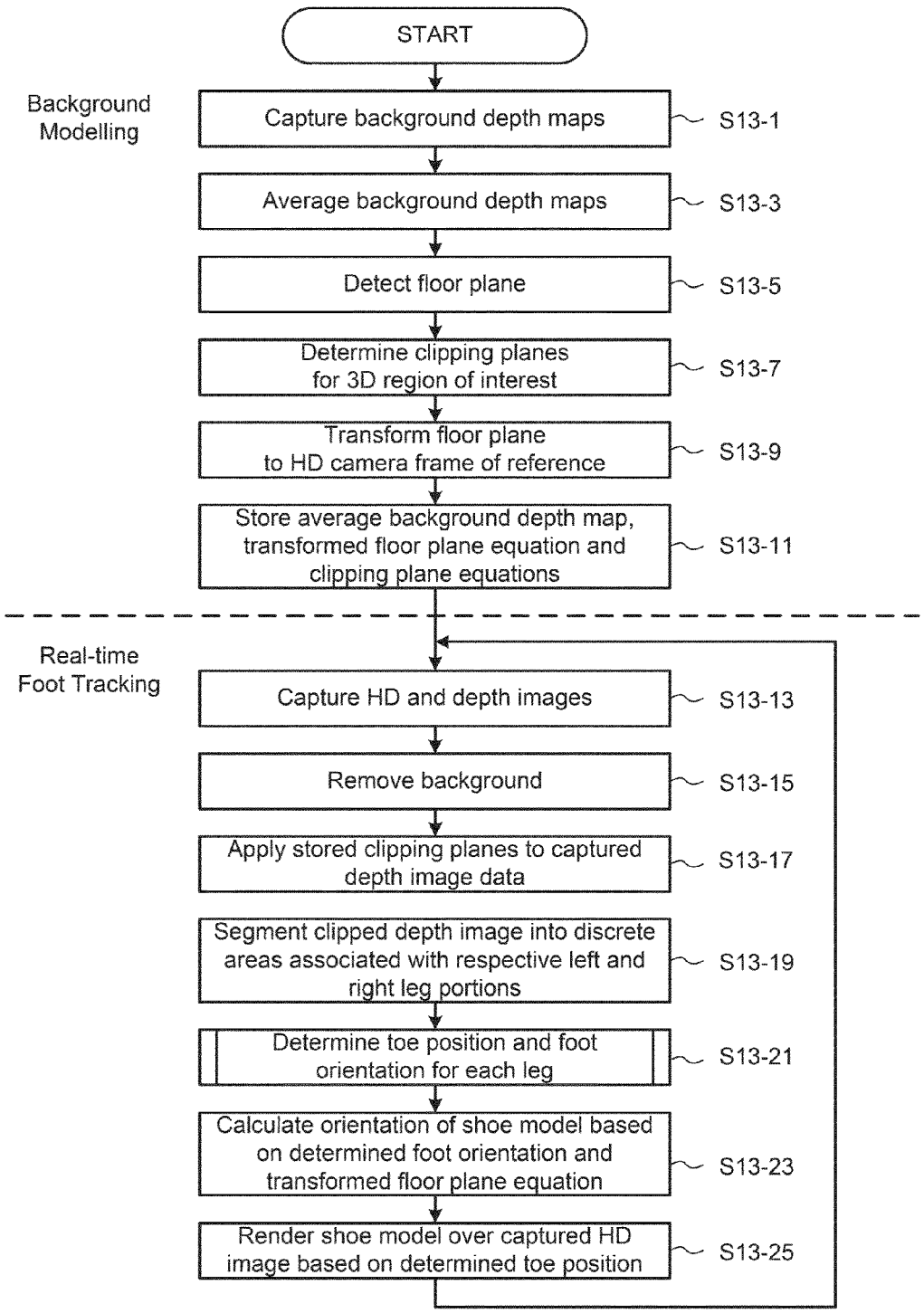
FIG. 13 is a flow diagram illustrating the main processing steps performed by the system of FIG. 1 according to another embodiment.

Referring to FIG. 13, the process in this embodiment begins with the foot tracking module 26 initiating steps of a scene calibration sub-process, similar to steps S1 to S3 described above. Typically, scene calibration can be performed once, prior to real-time use of the foot tracking system, and the generated background data can be stored on the local computer 16. Preferably, the scene is spatially organised as it would be during application usage with no user in the scene. Accordingly, at step S13-1, the foot tracking module 26 captures a series of background depth maps via the depth camera 12, in like manner to the step S1. At step S13-3, the captured background depth maps are averaged to form an averaged background depth map, in like manner to the step S2. In this way, the average depth of every pixel in the scene is recorded over a predefined number of captured frames, e.g. 100 frames, and can be stored in a texture array.

In this embodiment, the average depth of three user-specified points on the floor surrounding the user are also recorded over the predefined number of frames. The three points are used to calculate an equation for the floor plane in 3D space, at step S13-5. From the calculated floor plane equation, along with predefined or user-specified height, width and depth values identifying a target region of interest, the foot tracking module 26 determines equations for five further clipping planes, at step S13-7. The floor plane and the five clipping planes together represent a 3D cube defining an area of the captured scene that is expected to contain the user's lower body during real-time capture and tracking operation. At step S13-9, the floor plane equation is transformed from the coordinate space of the depth camera 12 to the coordinate space of the video camera 10, for example using the data gathered by the depth/RGB calibration logic 24 as described above. At step S13-11, the average scene depth and the transformed floor plane equation are stored as scene calibration data, for example in a memory (not shown) of the foot tracking computer 16, for subsequent use in the real-time foot tracking and augmented reality rendering process that will now be described.

Real-Time Foot Tracking

The real-time processing starts at a step S13-13, where the foot tracking module 26 captures image data from the video camera 10, and captures a depth map of the scene (and low resolution image data, if available) from the depth camera 12, in like manner to the step S22. At step S13-15, the background is removed by comparing the depth data from the average background scene depth saved in step S13-11, in like manner to the step S23. At step S13-17, the stored clipping planes are applied to the captured depth image data, to clip the depth data to the predefined region of interest. Any data outside the 3D clipping cube area can be discarded. FIG. 15A illustrates an example of the clipped foreground depth data that is output at step S13-17, including depth data representing the user's left and right lower legs and feet.

In this embodiment, the resultant foreground data is segmented into discrete areas and segments representing left and right legs identified, at step S13-19. Preferably, a flood fill algorithm is used to identify and generate the segment areas. The flood fill algorithm incorporates adjacent pixels into a single 2D region based on depth disparities. If neighbouring pixels are within a pre-defined depth delta then they are included in the flooded region. This process advantageously enables separation of the segments associated with the left and right legs, even when one leg is positioned in front of the other leg. FIG. 15B illustrates an example of the segmented depth data that is output at step S13-19, identifying a first discrete segmented area $S_1$ representing the user's left lower leg and foot, and a second discrete segmented area $S_2$ representing the user's right lower leg and foot.

At step S13-21, the foot tracking module 26 determines a toe position and foot orientation for each leg, as will be described in more detail below with reference to the flow diagram in FIG. 14. Alternatively, the toe position and foot orientation can determined as described in the embodiment above, referring to steps S24 to S41.

At step S13-23, the foot tracking module 26 calculates an orientation for the virtual shoe model based on the determined orientation of the foot (ankle-toe vector) and the transformed floor plane equation stored in step S13-11. At step S13-25, the augmented reality shoe models for the left and the right feet are rendered over the captured HD image data based on the respective determined toe positions, in like manner to the step S42.

Advantageously, the locating and tracking operations can be performed by the foot tracking module 26 for every captured frame of image and depth data.

Determine Toe Position and Foot Orientation

Figure 14:
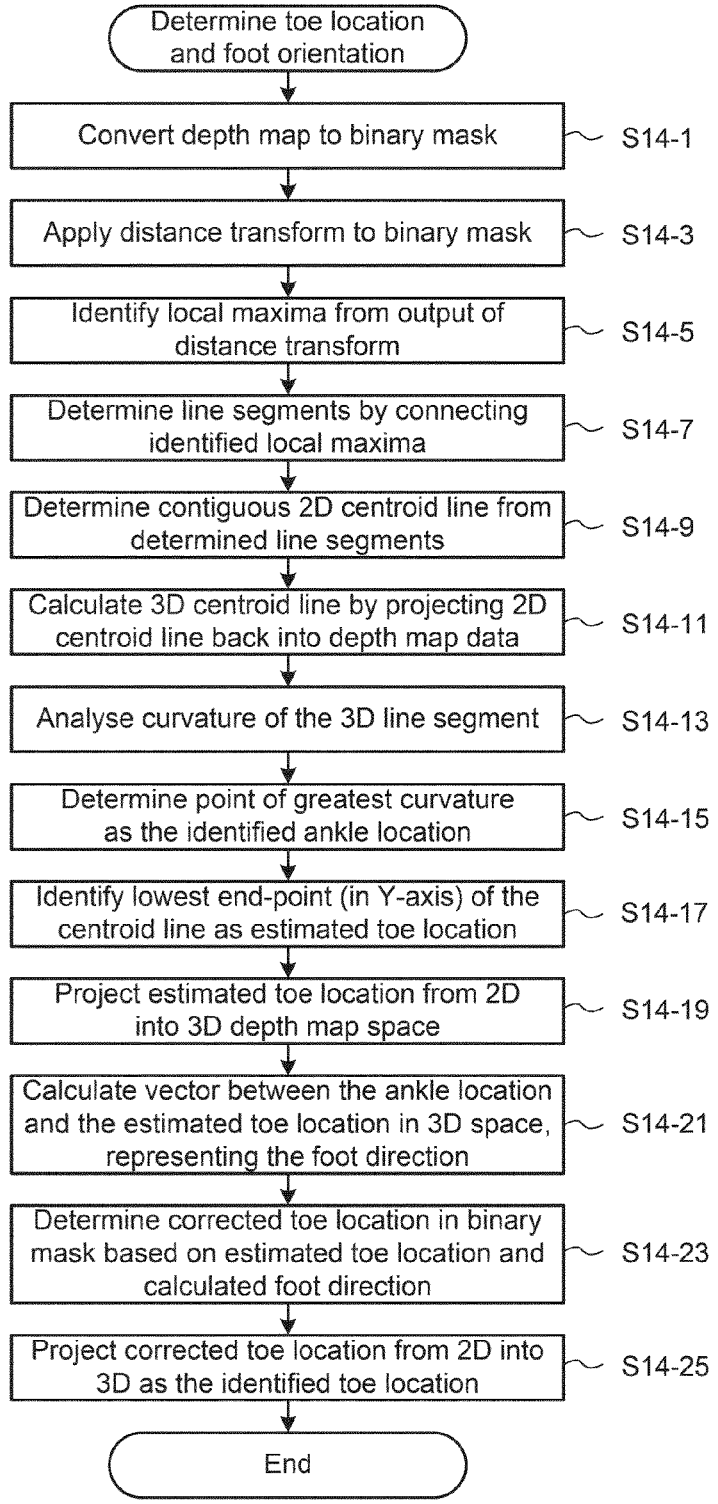
FIG. 14 is a flow diagram illustrating the main processing steps performed by the foot tracking computer in FIG. 1 according to the second embodiment.

Referring now to FIG. 14, the process for determining a toe location and foot orientation for a segmented area of the depth image according to the present embodiment will now be described. Reference is also made to FIGS. 15B to 15N, schematically illustrating an exemplary sequence of data processed and generated by the foot tracking computer 16 in this embodiment, for each of the determined segmented areas representing the user's left and right leg and foot, respectively.

At step S14-1, the foot tracking module 26 converts the depth data of a determined segmented area into a solid 2D binary mask, from the depth camera 12 viewpoint. FIG. 15C illustrates an example of the binary mask $M_1$ for the left leg segment $S_1$ identified in FIG. 15B, and FIG. 15D illustrates an example of the binary mask $M_2$ for the right leg segment $S_2$.

At step S14-3, the foot tracking module 26 applies a distance transform to the binary mask. The distance transform is a well-known technique for deriving a mapped representation of a digital image, for example by labeling each pixel of the input image or region with the distance to the nearest boundary pixel of the image or region. At step S14-5, local maxima are calculated from the output of the distance transform. The local maxima are aggregated into line segments based on adjacency, at step S14-7. FIG. 15E illustrates an example of line segments identified for the binary mask shown in FIG. 15B, and FIG. 15F illustrates an example of line segments identified for the binary mask shown in FIG. 15D.

At step S14-9, the line segments are analysed and stitched together into list of 2D points representing a contiguous line using heuristic assumptions based on knowledge of the anatomy of the human foot and whether we assume it to be left or right. This point list starts near the toe, located at the lowest Y-coordinate in the 2D binary mask, and runs up the leg (along the Y-axis). When considering each line segment, the foot tracking module 26 can be configured to add a candidate line segment to the final list of segments defining the centre line, when the candidate line segment fulfils the following conditions:

start point of the candidate segment is closer to end point of the previously added line segment than the start point of any other segment in the centre line;
  there is no longer segment where the start point is closer to the end point of the previous line than to the end point of the line in question; and
  the difference between the angle of the candidate line segment and the previously added line segment is less than a user-specified tuning value.

These conditions can be dynamically relaxed or tightened by the foot tracking module 26, for example depending on the number of line segments being considered by the algorithm, so as to prevent all line segment data being discarded when noisy.

Figure 15G:
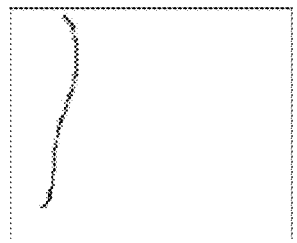
FIG. 15, which comprises FIGS. 15A to 15N, schematically illustrate an exemplary sequence of image data, depth map data and processed data in the foot tracking process of FIG. 14.
Figure 15H:
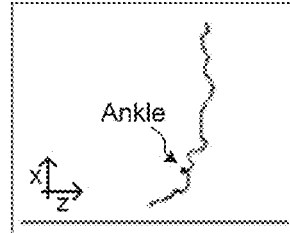
Figure 15J:
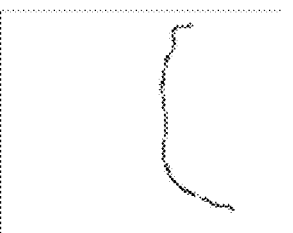

In this way, the foot tracking module 26 efficiently determines a centre line (also referred to as the centroid line or central skeleton representation) for the silhouette of each segmented area, as shown in the examples illustrated in FIGS. 15G and 15J. At step S14-11, the determined 2D centroid line is projected back into the depth map data to calculate the corresponding central skeleton representation in 3D space. The 3D curvature of the line is analysed by the foot tracking module 26 at step S14-13, and the point of greatest curvature is identified as the approximate ankle location at step S14-15. The line data calculated in the above steps can be discarded at this point. It will be appreciated that the curvature of the 3D centroid line can be calculated according to any one of several known techniques, such as polynomial or spline fitting, or multi-resolution 3 point dot product analysis. For example, the dot product method uses 3 equally spaced points (larger spacing reduces high frequency noise) to define two vectors. By applying a dot product to these vectors, the angle at the central point can be deduced. This angle takes into account all 3 independent axis (x, y, z), and is the angle that lies on the plane defined by the normal found from the cross product of the same two vectors.

Figure 15K:
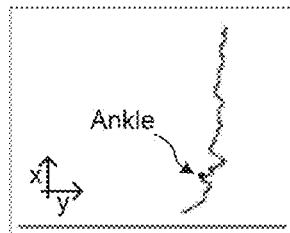
Figure 15I:
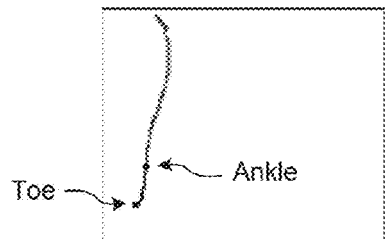
Figure 15L:
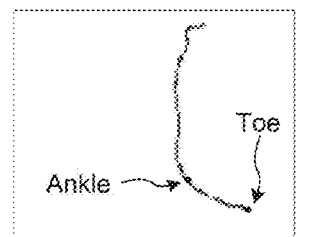

FIG. 15H illustrates an example of an approximated ankle location for the left leg based on an identified greatest curvature point of the 3D centroid line of FIG. 15G, identified in this example as a peak in the depth profile of the 3D centroid line along the Z-axis. FIG. 15K similarly illustrates an example of an approximated ankle location for the right leg based on an identified greatest curvature point of the 3D centroid line of FIG. 15J, identified in this example as a peak in the depth profile of the 3D centroid line along the Y-axis because the user's right foot is positioned at an angle of about 45 degrees relative to the depth camera 12. It will be appreciated that in practice, the identified curvature points take into account the curvature at each point in 3D space.

Figure 15M:
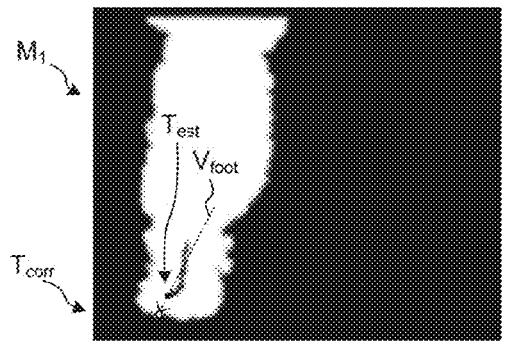
Figure 15N:
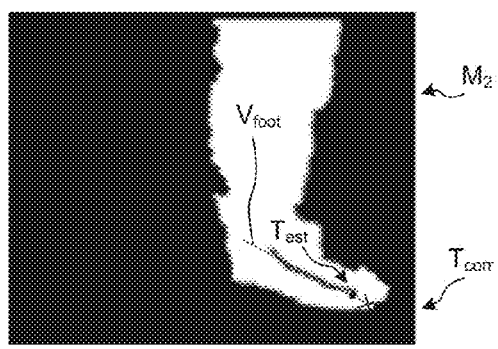

At step S14-17, the foot tracking module 26 identifies the lowest end point of the 2D centroid line (in the Y-axis) as the estimated location of the toe. At step S14-19, the estimated toe location is projected from the 2D coordinate space of the binary map to the 3D coordinate space of the depth map data. As an alternative, the lowest end point of the 3D centroid line can instead be determined and identified as the estimated toe location in 3D coordinate space. At step S14-21, the foot tracking module 26 calculates the vector from the identified ankle location to the estimated toe location in 3D coordinate space, representing the respective foot orientation (also referred to as the foot direction). Optionally, a corrected toe location can be determined by the foot tracking module 26 at step S14-23, using the estimated toe location mapped back to the 2D coordinate space of the binary mask, and the calculated vector representing the direction of the foot. As illustrated in FIGS. 15M and 15N for the respective left and right foot, the foot tracking module 16 traces from the projected estimated toe location $T_{est}$ in the original binary mask $M_1$, along the direction of the foot direction vector $V_{foot}$, to an identified edge of the binary mask image. The intersection between the traced line and the edge of the binary mask image is determined to be the actual, corrected toe location $T_{corr}$. At step S14-25, the corrected toe location $T_{corr}$ is projected from the 2D coordinate space into the 3D coordinate space of the depth map data, to determine the identified toe location in 3D.

As a further optional modification, the 2D points representing the ankle can be used to index into the original depth map to obtain the position of the heel in 3D coordinate space. Additionally, the 3D coordinates can be further converted from the coordinate space of the depth camera 12 to that of the HD video camera 10, for example using the data gathered by the depth/RGB calibration logic 24 as described above. As yet a further optional modification, the 3D coordinates can be smoothed out using an exponential moving average to compensate for possible bad/noisy data.

Computer Systems

Figure 16:
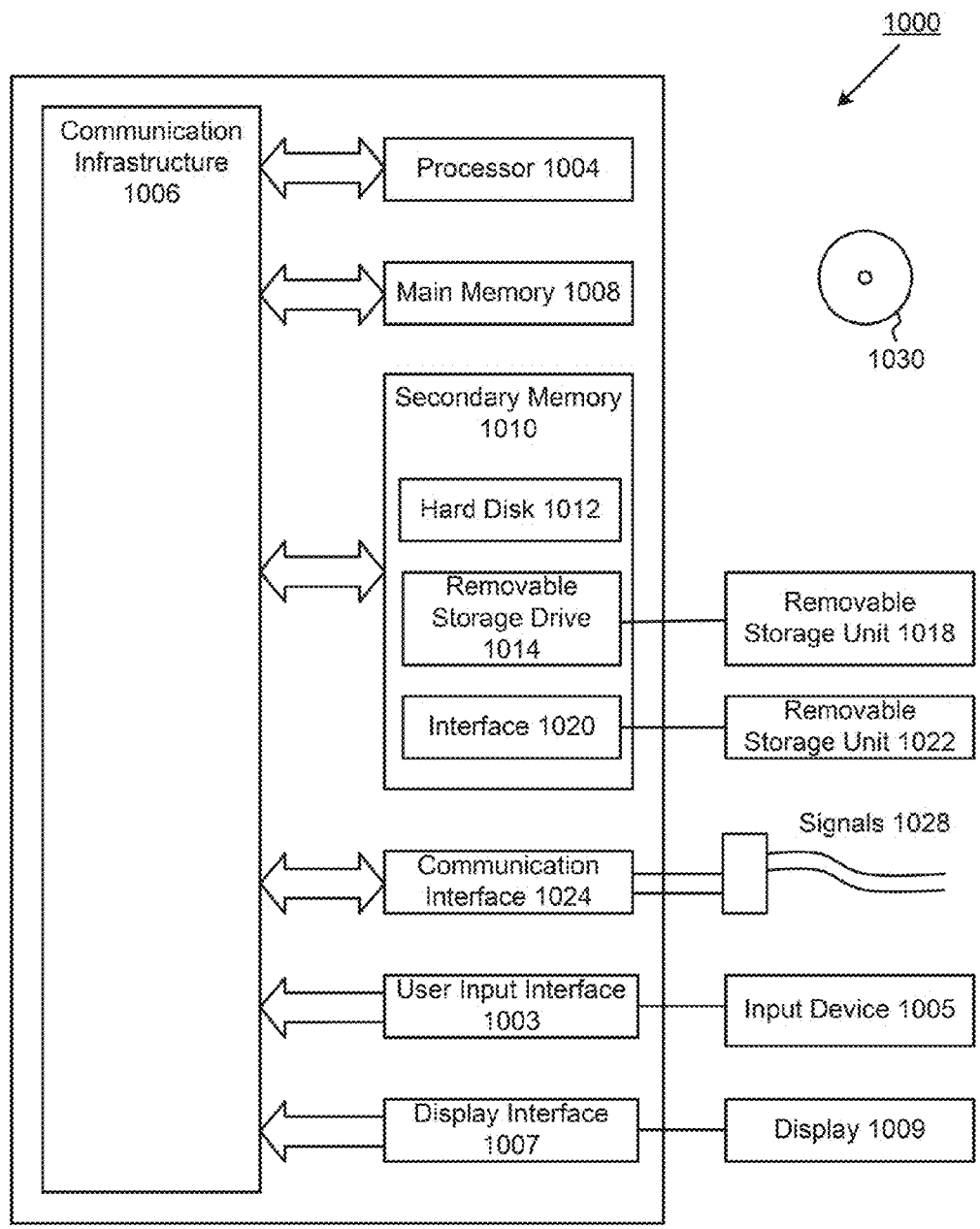
FIG. 16 is a diagram of an example of a computer system on which one or more of the functions of the embodiments may be implemented.

The entities described herein, such as the foot tracking computer, may be implemented by computer systems such as computer system 1000 as shown in FIG. 16. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein. Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention.

For example, in the embodiments described above, the cameras are referred to as RGB cameras. Those skilled in the art will appreciate that any suitable format of video imaging camera can instead be used to capture image data of the scene and the customer's feet, such as video cameras based on luminance-chrominance formats.

It will be appreciated that while the above-described embodiments relate to the virtual try-on of footwear, it will be appreciated that the techniques described above can also be applied to other application in which the tracking of a user's feet position and orientation is required. Examples might include motion tracking for computer games (for example to control an avatar or as an input for a dance-based game) or film-making.

The invention claimed is:

1. A system for tracking the location and orientation of a user's feet, comprising:
a depth sensor operable to generate a depth map of a scene within the field of view of the depth sensor, the field of view containing at least a portion of the user;
a camera for imaging the scene, the image data generated by the camera having a predetermined relationship to the depth map generated by the depth sensor;
a display device; and
a processor; and
a computer-readable memory storing instructions which, when executed by the processor, cause the processor to:
identify a portion of the depth map as a candidate object for foot tracking;
convert the identified portion of the depth map to a binary mask;
apply a distance transform to the binary mask;
identify local maxima from the output of the distance transform;
determine a line representation connecting the identified local maxima as a central skeleton representation of the identified portion;
determine a location of a toe of the user's foot and a location of an ankle of the user's foot, based on the central skeleton representation;
calculate an orientation of the user's foot based on the determined locations of the toe and the ankle;
overlay a representation of an item of footwear over the image data generated by the camera based on the determined toe location and orientation of the user's foot; and
output the resulting image to the display device for display on the display device.

2. A system according to claim 1, wherein the location of the ankle is determined by analysing the curvature of the central skeleton representation.

3. A system according to claim 1, wherein, when executed, the instructions further cause the processor to project the 2D line representation to a corresponding 3D representation in the depth map.

4. A system according to claim 1, wherein, when executed, the instructions further cause the processor to identify a portion of the depth map as a candidate object by removing background portions of the depth map to identify one or more foreground portions.

5. A system according to claim 4, wherein, when executed, the instructions further cause the processor to identify a portion of the depth map as a candidate object by flood filling the one or more foreground portions to identify discrete segments.

6. A system according to claim 1, wherein, when executed, the instructions further cause the processor to apply predetermined clipping planes to isolate a candidate region of the generated depth map.

7. A system according to claim 1, wherein, when executed, the instructions further cause the processor to determine a floor plane within the depth map, the floor plane representing the plane of a floor upon which the user is standing, and wherein an estimate of the orientation of the user's foot is obtained by calculating the cross product of a toe-ankle vector and the identified floor plane, the toe-ankle vector being a vector connecting the identified toe location and ankle location.

8. A system according to claim 1, further comprising a plurality of depth sensors provided at different positions with respect to the user, wherein, when executed, the instructions further cause the processor to generate a depth map from respective depth maps received from each of the depth sensors.

9. A system according to claim 1, wherein, when executed, the instructions further cause the processor to identify the location of the user's toe by determining the lowest point of the candidate object in the capture plane of the depth sensor, and starting from the determined lowest point searching along the edge of the candidate object for a predetermined distance and identifying the point of greatest curvature in the capture plane of the depth sensor as the location of the user's toe.

10. A system according to claim 9, wherein, when executed, the instructions further cause the processor to identify the location of the user's ankle by:
following a centre line from the identified toe location along the candidate object in the capture plane of the depth sensor, wherein the centre line is followed for a predetermined distance in 3D from the identified toe location to find the ankle location;
identifying a first centre point of a horizontal line spanning the candidate object at a first vertical location a predetermined distance above the identified toe location;
setting a first search axis which intercepts the toe location and the identified first centre point;

determining a further location a predetermined distance along the first search axis from the first centre point away from the identified toe location;

identifying a further centre point of a line spanning the candidate object in a direction perpendicular to the first search axis; and setting a second search axis which intercepts the toe location and the identified further centre point.

11. A system according to claim 10, wherein, when executed, the instructions further cause the processor to calculate the orientation of the user's foot based on the direction of an axis passing through the identified toe location and the identified ankle location of a candidate object.

12. A system according to claim 11, wherein, when executed, the instructions further cause processor to calculate the orientation of the user's foot based on a major axis determined by principal component analysis of the voxel positions below the identified ankle location within the depth map.

13. A computer-implemented method of determining the location and orientation of a user's feet within captured scene data, comprising:

receiving, from a depth sensor, a depth map of a scene within the field of view of the depth sensor, the field of view containing at least a portion of the user;

receiving, from a camera, image data of the scene having a predetermined relationship to the depth map generated by the depth sensor;

identifying a portion of the depth map as a candidate object for foot tracking;

converting the identified portion of the depth map to a binary mask;

applying a distance transform to the binary mask;

identifying local maxima from the output of the distance transform;

determining a line representation connecting the identified local maxima as a central skeleton representation of the identified portion;

determining a location of a toe of the user's foot and a location of an ankle of the user's foot, based on the central skeleton representation;

calculating an orientation of the user's foot based on the determined locations of the toe and the ankle;

overlaying a representation of an item of footwear over the image data generated by the camera based on the determined toe location and orientation of the user's foot; and outputting, to a display device, the resulting image, for display on the display device.

14. A non-transitory computer-readable medium comprising computer-executable instructions, that when executed by a suitable computer, cause the computer to perform a method of:

receiving, from a depth sensor, a depth map of a scene within the field of view of the depth sensor, the field of view containing at least a portion of the user;

receiving, from a camera, image data of the scene having a predetermined relationship to the depth map generated by the depth sensor;

identifying a portion of the depth map as a candidate object for foot tracking;

converting the identified portion of the depth map to a binary mask;

applying a distance transform to the binary mask;

identifying local maxima from the output of the distance transform;

determining a line representation connecting the identified local maxima as a central skeleton representation of the identified portion;

determining a location of a toe of the user's foot and a location of an ankle of the user's foot, based on the central skeleton representation;

calculating an orientation of the user's foot based on the determined locations of the toe and the ankle;

overlaying a representation of an item of footwear over the image data generated by the camera based on the determined toe location and orientation of the user's foot; and outputting, to a display device, the resulting image, for display on the display device.

* * * * *